US012632670B2

(12) United States Patent
Friedman et al.

(10) Patent No.: US 12,632,670 B2
(45) Date of Patent: *May 19, 2026

(54) NATURAL LANGUAGE PROCESSING FOR IDENTIFYING BIAS IN A SPAN OF TEXT

(71) Applicant: Smart Information Flow Technologies, LLC, Minneapolis, MN (US)

(72) Inventors: Scott Friedman, Minneapolis, MN (US); Vasanth Sarathy, Chelmsford, MA (US); Sara Friedman, Minneapolis, MN (US)

(73) Assignee: Smart Information Flow Technologies, LLC, Minneapolis, MN (US)

( * ) Notice: Subject to any disclaimer, the term of this patent is extended or adjusted under 35 U.S.C. 154(b) by 222 days.

This patent is subject to a terminal disclaimer.

(21) Appl. No.: 18/179,842

(22) Filed: Mar. 7, 2023

(65) Prior Publication Data

US 2023/0316003 A1 Oct. 5, 2023

Related U.S. Application Data

(60) Provisional application No. 63/325,914, filed on Mar. 31, 2022.

(51) Int. Cl.
*G06F 40/30* (2020.01)
*G06F 40/166* (2020.01)
(Continued)

(52) U.S. Cl.
CPC ............ *G06F 40/40* (2020.01); *G06F 40/166* (2020.01); *G06F 40/284* (2020.01); *G06F 40/30* (2020.01);
(Continued)

(58) Field of Classification Search
CPC ........ G06N 3/0442; G06N 3/08; G06F 40/40; G06F 40/284; G06F 40/166; G06F 40/58; G06F 40/30; G06F 40/205
See application file for complete search history.

(56) References Cited

U.S. PATENT DOCUMENTS 10,671,942 B1 * 6/2020 McGovern .............. G06F 18/24
11,048,741 B2 * 6/2021 Cintas ................... G06F 16/335
(Continued)

FOREIGN PATENT DOCUMENTS

CN 114218947 A * 3/2022 ............. G06N 3/044

OTHER PUBLICATIONS

Cruz, André Ferreira, Gil Rocha, and Henrique Lopes Cardoso. "On document representations for detection of biased news articles." Proceedings of the 35th annual ACM symposium on applied computing. 2020. (Year: 2020).*
(Continued)

*Primary Examiner* — Andrew C Flanders
*Assistant Examiner* — Theodore Withey
(74) *Attorney, Agent, or Firm* — Young Basile Hanlon & MacFarlane, P.C.

(57) ABSTRACT

A computing machine accesses text from a record. The computing machine identifies, using a natural language processing engine, an entity mapped to a first span of the text. The first span includes a contiguous sequence of one or more words or subwords in the text. The computing machine determines a bias category for the entity. The bias category is selected from a predefined list of bias categories. The determined bias category for the entity depends on a second span of the text. The second span includes a contiguous sequence of one or more words or subwords in the text. The second span is different from the first span.

18 Claims, 18 Drawing Sheets

(51) Int. Cl.

| | |
|---|---|
| *G06F 40/205* | (2020.01) |
| *G06F 40/284* | (2020.01) |
| *G06F 40/40* | (2020.01) |
| *G06F 40/58* | (2020.01) |
| *G06N 3/0442* | (2023.01) |
| *G06N 3/08* | (2023.01) |

(52) U.S. Cl.

CPC ........... *G06F 40/58* (2020.01); *G06N 3/0442* (2023.01); *G06N 3/08* (2013.01); *G06F 40/205* (2020.01)

(56) References Cited

U.S. PATENT DOCUMENTS

| | | | |
|---|---|---|---|
| 2018/0246873 A1 | 8/2018 | Latapie et al. | |
| 2020/0143247 A1* | 5/2020 | Jonnalagadda | G06N 3/044 |
| 2020/0210695 A1* | 7/2020 | Walters | G06F 40/186 |
| 2020/0250264 A1* | 8/2020 | Bhide | G06F 40/35 |
| 2021/0056263 A1 | 2/2021 | Xia et al. | |
| 2021/0365773 A1* | 11/2021 | Subramanian | G06F 40/166 |
| 2021/0406706 A1* | 12/2021 | Hasan | G06N 3/08 |
| 2021/0406712 A1* | 12/2021 | Bhide | G06N 5/04 |
| 2022/0075945 A1* | 3/2022 | Zhang | G06F 40/284 |
| 2022/0180068 A1* | 6/2022 | Sahayaraj | G06F 40/166 |
| 2022/0180991 A1* | 6/2022 | Peters | G16H 50/20 |
| 2022/0335217 A1* | 10/2022 | Panwar | G06F 40/30 |
| 2023/0067628 A1* | 3/2023 | Carter | G06F 16/489 |
| 2023/0153687 A1* | 5/2023 | Vu | G06N 3/0895 706/12 |
| 2023/0342558 A1* | 10/2023 | Wang | G06F 40/295 |
| 2024/0126995 A1 | 4/2024 | Ahmed et al. | |

OTHER PUBLICATIONS

Spinde, Timo, et al. "Automated identification of bias inducing words in news articles using linguistic and context-oriented features." Information Processing & Management 58.3 (2021): 102505. (Year: 2021).*

Alipourfard, N., et al. (2021). Systematizing Confidence in Open Research and Evidence (SCORE). SocArXiv.

Allen, J., de Beaumont, W., Galescu, L., & Teng, C. M. (2015). Complex event extraction using drum. Technical report, Florida Institute for Human and Machine Cognition Pensacola United States.

Aziato, L., Odai, P. N., & Omenyo, C. N. (2016). Religious beliefs and practices in pregnancy and labour: an inductive qualitative study among post-partum women in ghana. BMC pregnancy and childbirth, 16, 1-10.

Beltagy, I., Lo, K., & Cohan, A. (2019). Scibert: A pretrained language model for scientific text. arXiv preprint arXiv:1903. 10676.

Bolukbasi, T., Chang, K.-W., Zou, J. Y., Saligrama, V., & Kalai, A. T. (2016). Man is to computer programmer as woman is to homemaker? debiasing word embeddings. Advances in neural information processing systems, 29, 4349-4357.

Das, D., Schneider, N., Chen, D., & Smith, N. A. (2010). Probabilistic frame-semantic parsing. Human language technologies: The 2010 annual conference of the North American chapter of the association for computational inguistics (pp. 948-956).

Dennett, D. C. (1989). The intentional stance. MIT press.

Devlin, J., Chang, M.-W., Lee, K., & Toutanova, K. (2019). BERT: Pre-training of deep bidirectional transformers for language understanding. Proceedings of NAACL-HLT 2019 (pp. 4171-4186). Minneapolis, Minnesota: Association for Computational Linguistics. From https: //www.aclweb.org/anthology/N19-1423.

Eberts, M., & Ulges, A. (2020). Span-based joint entity and relation extraction with transformer pre-training. 24th European Conference on Artificial Intelligence.

Fellbaum, C. (2010). Wordnet. In Theory and applications of ontology: computer applications, 231-243. Springer.

Forbus, K. D. (1984). Qualitative process theory. Artificial Intelligence, 24, 85-168.

Forbus, K. D. (2019). Qualitative representations: How people reason and learn about the continuous world. MIT Press.

Friedman, S., Schmer-Galunder, S., Chen, A., & Rye, J. (2019). Relating word embedding gender biases to gender gaps: A cross-cultural analysis. Proceedings of the First Workshop on Gender Bias in Natural Language Processing (pp. 18-24).

Friedman, S. E., Magnusson, I. H., Schmer-Galunder, S. M., Wheelock, R., Gottlieb, J., Patel, P., & Miller, C. (2021). Toward Transformer-Based NLP for Extracting Psychosocial Indicators of Moral Disengagement. Annual Meeting of the Cognitive Science Community (CogSci).

Garg, N., Schiebinger, L., Jurafsky, D., & Zou, J. (2018). Word embeddings quantify 100 years of gender and ethnic stereotypes. Proceedings of the National Academy of Sciences, 115, E3635-E3644.

Gelman, B., Clark, C., Friedman, S. E., Kuter, U., & Gentile, J. E. (2021). Toward a robust method for understanding the replicability of research. AAAI Workshop on Scientific Document Understanding.

Kuipers, B. (1986). Qualitative simulation. Artificial Intelligence, 29, 289-338.

Lee, K., He, L., Lewis, M., & Zettlemoyer, L. (2017). End-to-end neural coreference resolution. Proceedings of the 2017 Conference on Empirical Methods in Natural Language Processing (pp. 188-197). Copenhagen, Denmark: Association for Computational Linguistics. From https: //www.aclweb.org/anthology/D17-1018.

Lombrozo, T., & Carey, S. (2006). Functional explanation and the function of explanation. Cognition, 99, 167-204.

Loureiro, D., & Jorge, A. (2019). Language modelling makes sense: Propagating representations through WordNet for full-coverage word sense disambiguation. Proceedings of the 57th Annual Meeting of the Association for Computational Linguistics (pp. 5682-5691). Florence, Italy: As-sociation for Computational Linguistics. From https://www.aclweb.org/anthology/P19-1569.

Magnusson, I. H., & Friedman, S. E. (2021). Extracting fine-grained knowledge graphs of scientific claims: Dataset and transformer-based results. Proceedings of the 2021 Conference on Empirical Methods in Natural Language Processing (EMNLP).

Mueller, R., & Abdullaev, S. (2019). Deepcause: Hypothesis extraction from information systems papers with deep learning for theory ontology learning. Proceedings of the 52nd Hawaii Inter-national Conference on System Sciences.

Pustejovsky, J. (1991). The syntax of event structure. Cognition, 41, 47-81.

Wang, L. L., et al. (2020). CORD-19: The COVID-19 Open Research Dataset.

Astor, M. (2019). How the politically unthinkable can become mainstream. New York Times, 26.

Bandura, A. (1999). Moral disengagement in the perpetration of inhumanities. Personality and social psychology review, 3(3), 193-209.

Bandura, A. (2002). Selective moral disengagement in the exercise of moral agency. Journal of moral education, 31(2), 101-119.

Bandura, A. (2016). Moral disengagement: How people do harm and live with themselves. Worth publishers.

Ging, D. (2019). Alphas, betas, and incels: Theorizing the masculinities of the manosphere. Men and Masculinities, 22 (4), 638-657.

Hoffman, B., Ware, J., & Shapiro, E. (2020). Assessing the threat of incel violence. Studies in Conflict & Terrorism, 43 (7), 565-587.

Hoover, J., Portillo-Wightman, G., Yeh, L., Havaldar, S., Davani, A. M., Lin, Y., . . . others (2020). Moral foundations twitter corpus: A collection of 35k tweets annotated for moral sentiment. Social Psychological and Personality Science, 11(8), 1057-1071.

Kennedy, B., Atari, M., Davani, A. M., Yeh, L., Omrani, A., Kim, Y., . . . others (2018). The gab hate corpus: A collection of 27k posts annotated for hate speech.

Magnusson, I. H., & Friedman, S. E. (2021). Graph knowledge extraction of causal, comparative, predictive, and proportional

(56)         References Cited

OTHER PUBLICATIONS associations in scientific claims with a transformer-based model. In AAAI Workshop on Scientific Document Understanding.

Mendelsohn, J., Tsvetkov, Y., & Jurafsky, D. (2020). A framework for the computational linguistic analysis of dehumanization. Frontiers in Artificial Intelligence, 3, 55.

Olteanu, A., Castillo, C., Boy, J., & Varshney, K. (2018). The effect of extremist violence on hateful speech online. In Proceedings of the International AAAI Conference on Web and Social Media (vol. 12).

Peters, J., Grynbaum, M., Collins, K., Harris, R., & Taylor, R. (2019). How the El Paso Killer Echoed the Incendiary Words of Conservative Media Stars. The New York Times.

Saidon, I., Galbreath, J., & Whiteley, A. (2010). Antecedents of moral disengagement: Preliminary empirical study in malaysia. In Proceedings of the 24th annual australian and new zealand academy of management conference.

Soral, W., Bilewicz, M., & Winiewski, M. (2018). Exposure to hate speech increases prejudice through desensitization. Aggressive behavior, 44(2), 136-146.

Turner, R. M. (2008). Moral disengagement as a predictor of bullying and aggression: Are there gender differences? The University of Nebraska-Lincoln.

Van Bavel, J. J., & Pereira, A. (2018). The partisan brain: An identity-based model of political belief. Trends in cognitive sciences, 22(3), 213-224.

Voigt, R., Camp, N. P., Prabhakaran, V., Hamilton, W. L., Hetey, R. C., Griffiths, C. M., . . . Eberhardt, J. L. (2017). Language from police body camera footage shows racial disparities in officer respect. Proceedings of the National Academy of Sciences, 114(25), 6521-6526.

Non-Final Office Action mailed on Apr. 11, 2025 for U.S. Appl. No. 18/179,862, 31 pp.

Final Office Action mailed on Sep. 8, 2025 for U.S. Appl. No. 18/179,862, 13 pp.

* cited by examiner

600

602 — ACCESS TEXT FROM A RECORD

604 — TOKENIZE THE TEXT TO GENERATE A PLURALITY OF TOKENS

606 — IDENTIFY TOKEN(S) INCLUDING AN ATTRIBUTE OF A SUBJECT

608 — IDENTIFY TOKEN(S) INCLUDING AN ATTRIBUTE OF A SUBJECT

610 — DETERMINE A BIAS IN THE TEXT

612 — PROVIDE AN OUTPUT REPRESENTING THE DETERMINED BIAS

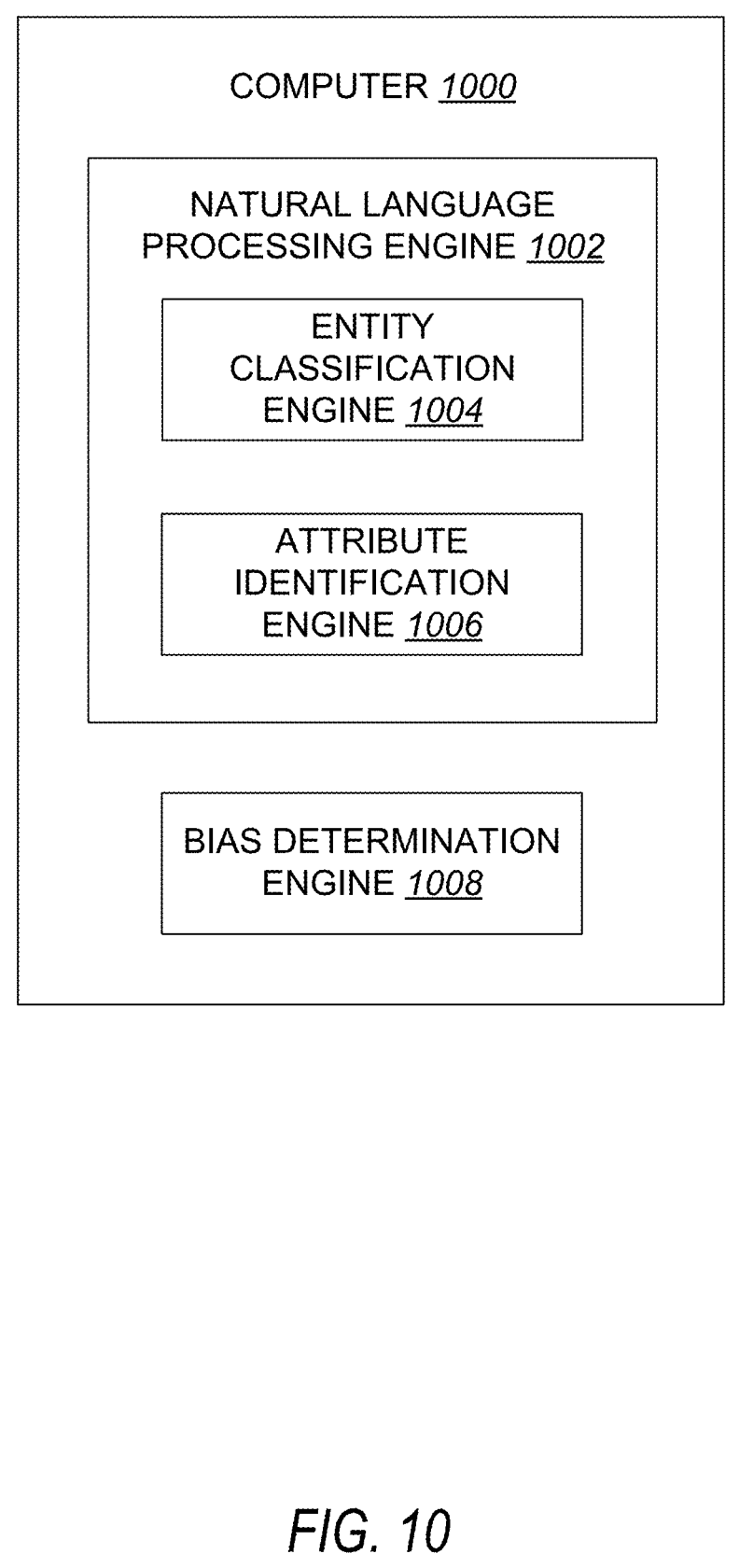

COMPUTER *1000*

NATURAL LANGUAGE
PROCESSING ENGINE *1002*

ENTITY
CLASSIFICATION
ENGINE *1004*

ATTRIBUTE
IDENTIFICATION
ENGINE *1006*

BIAS DETERMINATION
ENGINE *1008*

*FIG. 10*

| NPL Analaysis | Input Data | Human Labelling | Metric(s) | Example |
|---|---|---|---|---|
| Sentence–Level Classification | | Labeled sentences Each sentence labeled with presence or absence of each target category. | • Accuracy • Precision • Recall • F1 | ["*On arrival to trauma bay, patient was combative.*"] Sentence Label: *Aggressive* |
| Span–Level Classification | Sentencized text NLP models and regular expressions segment text into discrete sentences. | Labeled spans Spans labeled with patent regard categories (PRCs) | • Precision • Recall • F1 | "On arrival to trauma bay, patient was [*combative*]." Span Label: *Aggressive* |
| Span–Level Sentiment Scoring | | Spans: All spans describing Patient are identified. Scored spans Spans scored for Positive/negative/neutral Sentiment of language | • RMSE | "On arrival to trauma bay, patient was [*combative*]." Span Sentiment (-1...1): *-0.9 (negative sentiment)* |

ACCESS TEXT FROM A RECORD

1704

IDENTIFY AN ENTITY MAPPED TO A FIRST SPAN OF THE TEXT

1706

DETERMINE A BIAS CATEGORY FOR THE ENTITY

*1800*

1802

RECEIVE AN ENTRY OF TEXT

1804

IDENTIFY A FIRST SPAN OF THE TEXT INCLUDING A
REFERENCE TO A SUBJECT

1806

IDENTIFY A SECOND SPAN OF THE TEXT INCLUDING
AN ATTRIBUTE OF THE SUBJECT

1808

DETERMINE A BIAS IN THE TEXT

1810

PROVIDE FOR DISPLAY OF AN INDICATION OF THE
DETERMINED BIAS

NATURAL LANGUAGE PROCESSING FOR IDENTIFYING BIAS IN A SPAN OF TEXT

PRIORITY CLAIM

This application claims priority to U.S. Provisional Patent Application No. 63/325,914, titled "NATURAL LANGUAGE PROCESSING FOR ADDRESSING BIAS," filed on Mar. 31, 2022, the entire disclosure of which is incorporated herein by reference.

STATEMENT REGARDING FEDERALLY SPONSORED RESEARCH OR DEVELOPMENT

This invention was made with government support under Contract Number FA8650-19-C-6025 awarded by Air Force Research Laboratory (AFRL). The government has certain rights in this invention.

TECHNICAL FIELD

Embodiments pertain to computer architecture. Some embodiments relate to artificial intelligence. Some embodiments relate to natural language processing for addressing bias.

BACKGROUND

Drafters of text may consciously or unconsciously inject bias into the text. This bias may result in discomfort for readers of the text. It may be desirable to use a computer to reduce or eliminate the bias. However, automatically recognizing bias by computer may be difficult. Computer-implemented techniques for identifying and addressing bias in text may be desirable.

BRIEF DESCRIPTION OF THE DRAWINGS

FIG. 10 is a block diagram of an example computer for natural language processing for addressing bias, in accordance with some embodiments.

FIG. 11 illustrates an example natural language processing analyses across levels of detail, in accordance with some embodiments.

DETAILED DESCRIPTION

Figure 1:
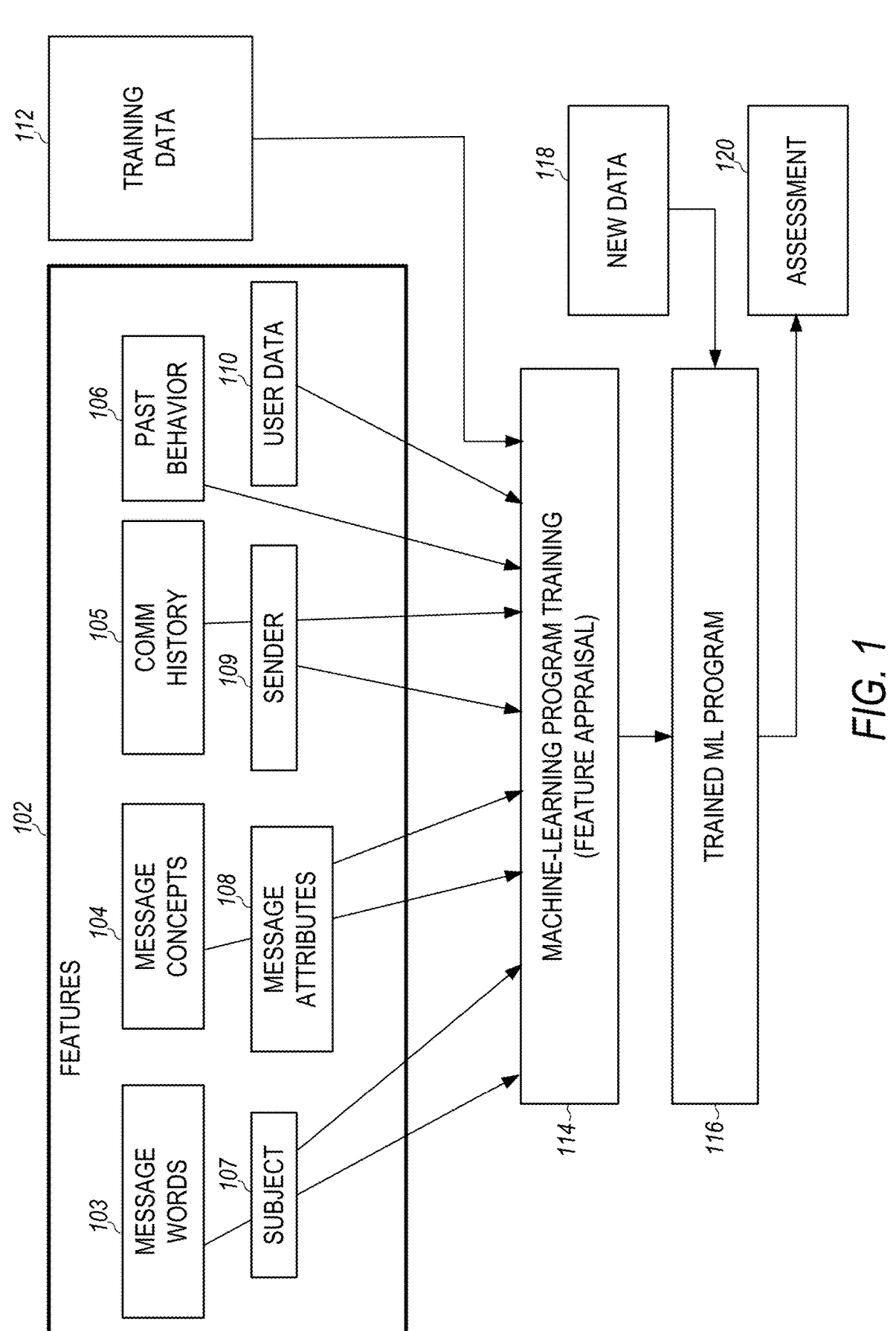
FIG. 1 illustrates the training and use of a machine-learning program, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Aspects of the present technology may be implemented as part of a computer system. The computer system may be one physical machine, or may be distributed among multiple physical machines, such as by role or function, or by process thread in the case of a cloud computing distributed model. In various embodiments, aspects of the technology may be configured to run in virtual machines that in turn are executed on one or more physical machines. It will be understood by persons of skill in the art that features of the technology may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software, the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As used herein, the term "model" encompasses its plain and ordinary meaning. A model may include, among other things, one or more engines which receive an input and compute an output based on the input. The output may be a classification. For example, an image file may be classified as depicting a cat or not depicting a cat. Alternatively, the image file may be assigned a numeric score indicating a likelihood whether the image file depicts the cat, and image files with a score exceeding a threshold (e.g., 0.9 or 0.95) may be determined to depict the cat.

This document may reference a specific number of things (e.g., "six mobile devices"). Unless explicitly set forth otherwise, the numbers provided are examples only and may be replaced with any positive integer, integer or real number, as would make sense for a given situation. For example, "six mobile devices" may, in alternative embodiments, include any positive integer number of mobile devices. Unless otherwise mentioned, an object referred to in singular form (e.g., "a computer" or "the computer") may include one or multiple objects (e.g., "the computer" may refer to one or multiple computers).

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used classification tasks, for example, those described herein.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

Figure 2:
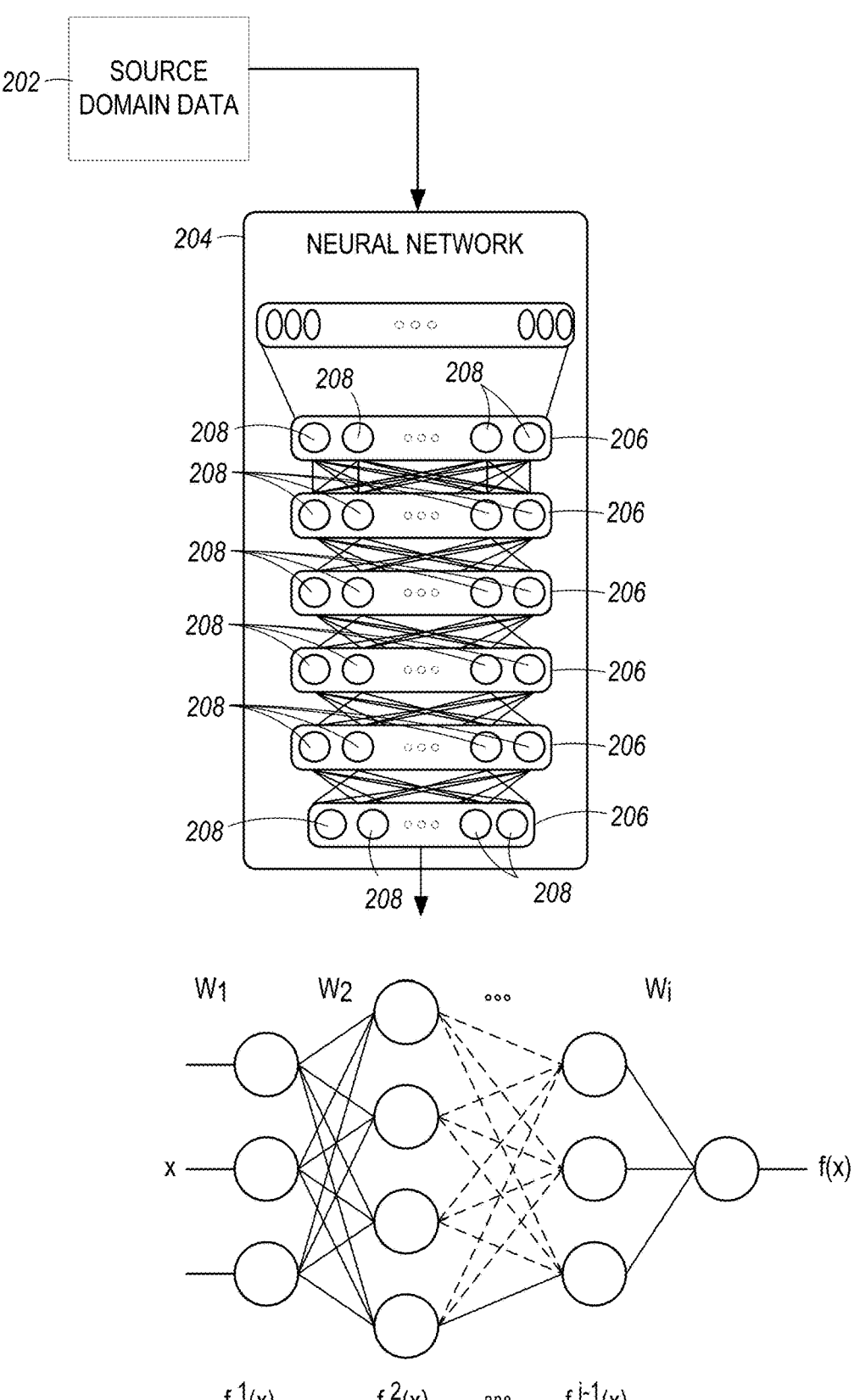
FIG. 2 illustrates an example neural network, in accordance with some embodiments.

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1$, $W_2$, . . . , $W_i$ are applied to the input to each layer to arrive at $f^1(x)$, $f^2(x)$, . . . , $f^{i-1}(x)$, until finally the output $f(x)$ is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM node serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
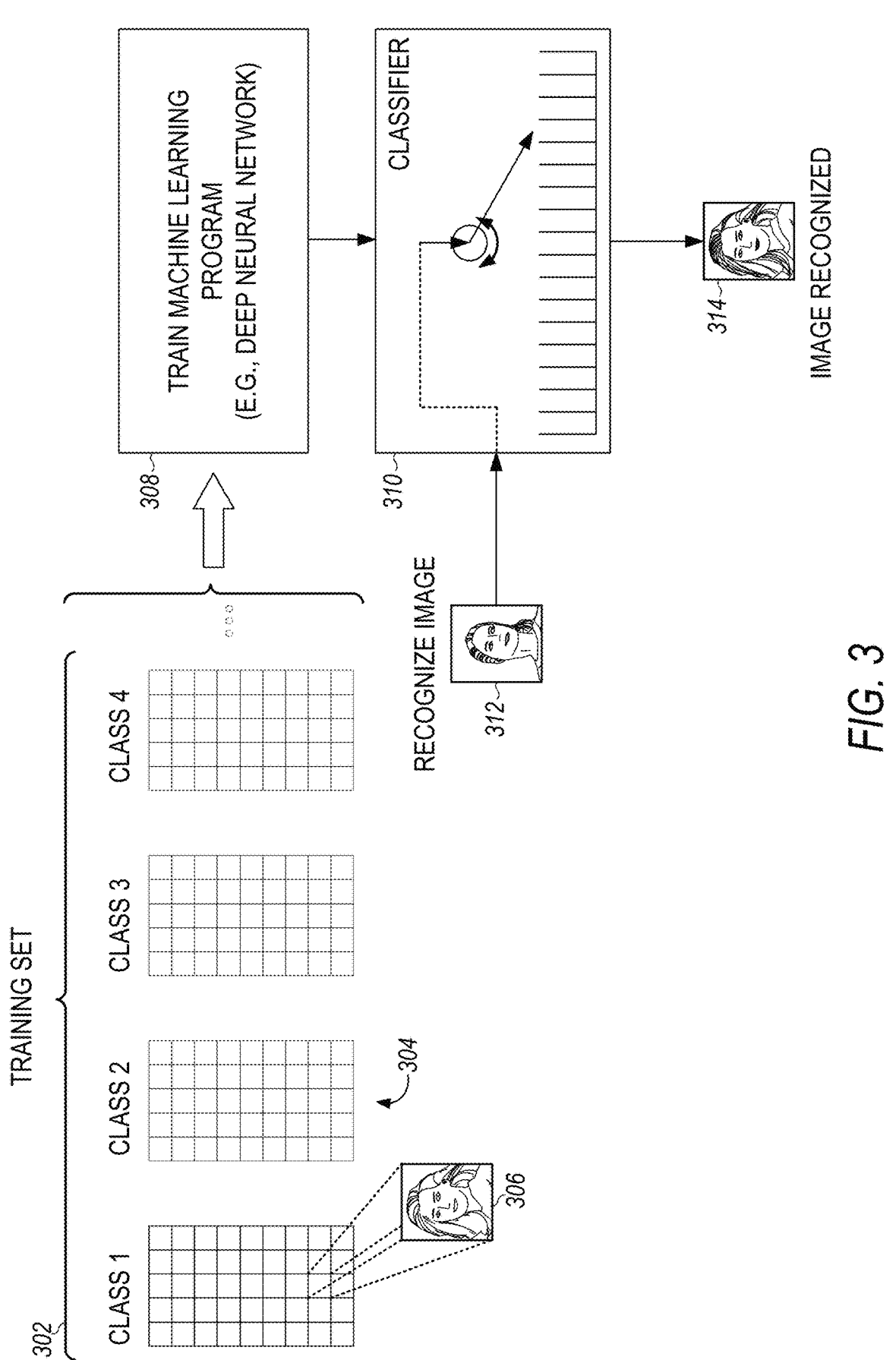
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Barack Obama, one class corresponds to George W. Bush, one class corresponds to Bill Clinton, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
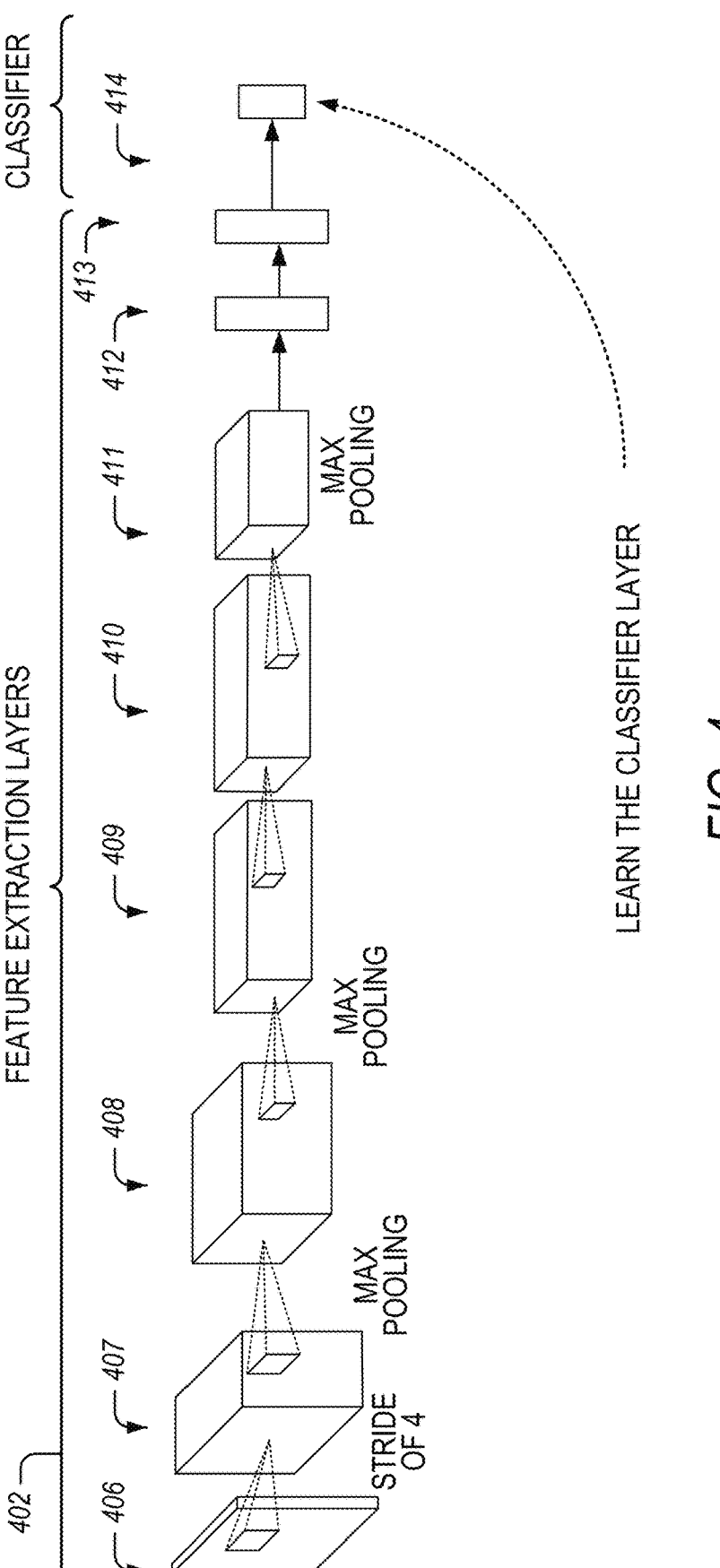
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
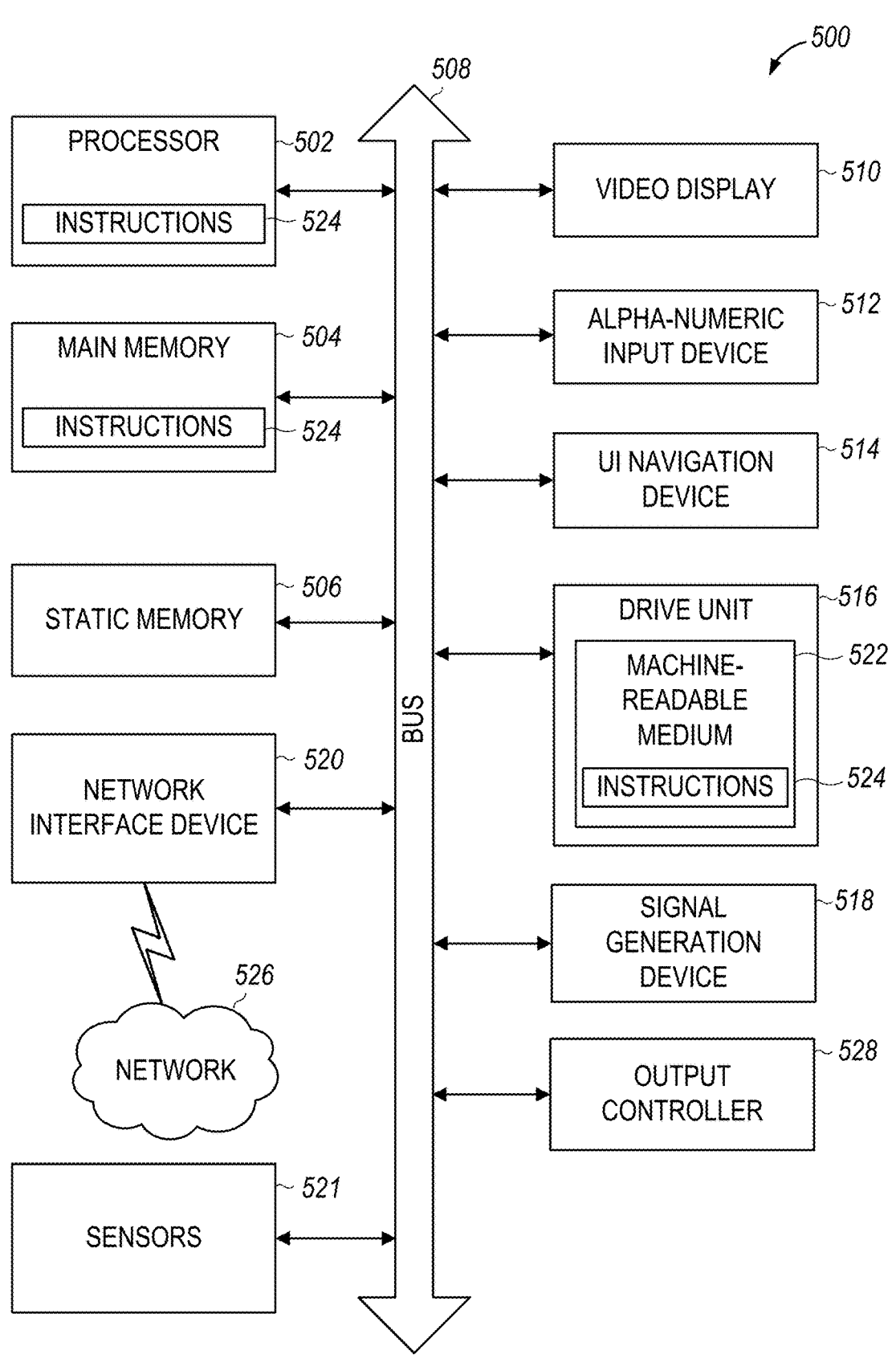
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figure 6:
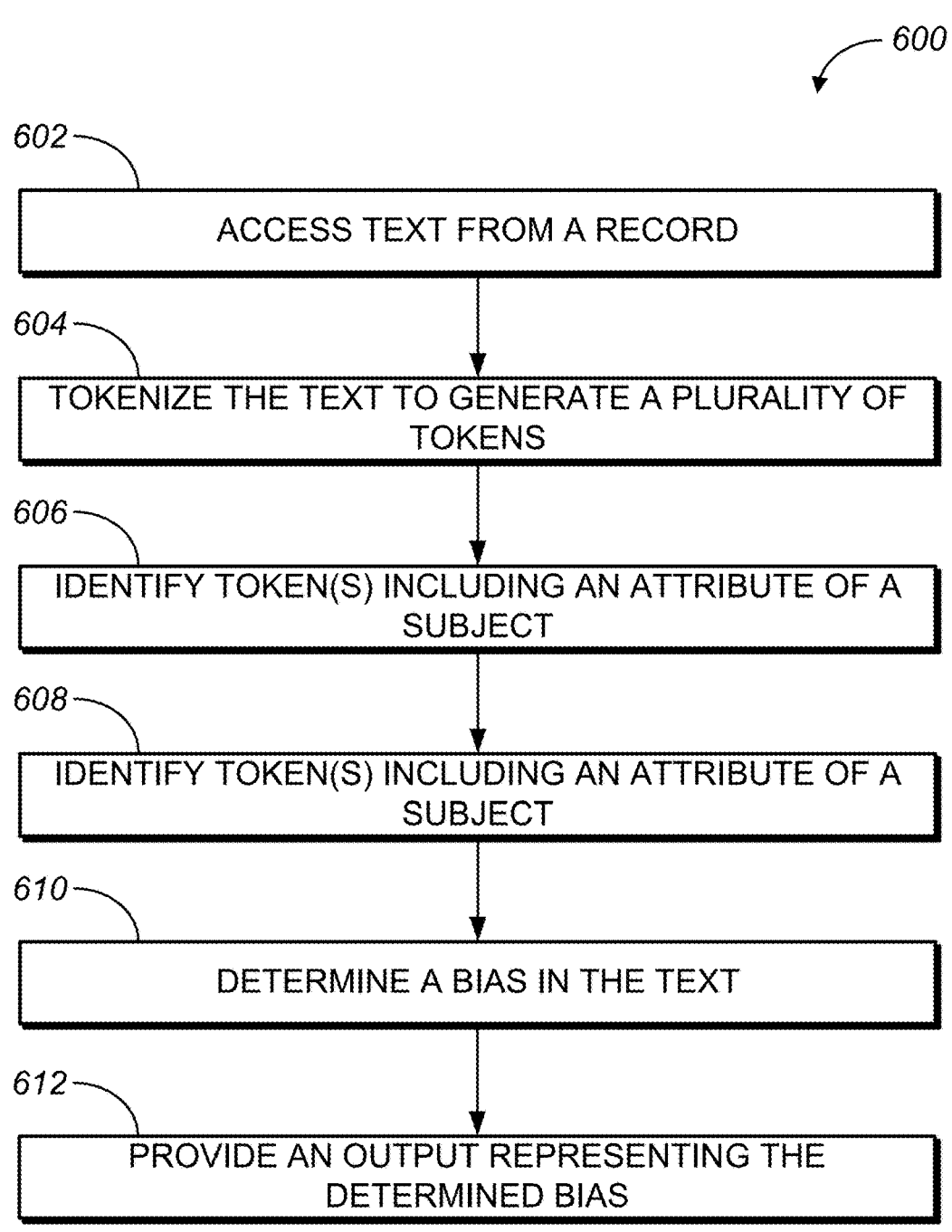
FIG. 6 is a flow chart of a first method of natural language processing for addressing bias, in accordance with some embodiments.

FIG. 6 is a flow chart of a first method 600 of natural language processing for addressing bias.

At block 602, a computing machine (e.g., computing machine 500) accesses text from a record.

At block 604, the computing machine tokenizes the text to generate a plurality of tokens. As used herein, the term "tokenizing" may include, among other things, breaking text into individual linguistic units (tokens). A token may include a word, a combination of words, or a part of a word (e.g., a prefix or a suffix).

At block 606, the computing machine identifies, from the plurality of tokens and using an entity classifier sub-engine of a natural language processing engine at the computing machine, at least one token including a reference to a subject.

At block 608, the computing machine identifies, from the plurality of tokens and using the natural language processing engine, at least one token including an attribute of a subject.

At block 610, the computing machine determines, based on at least one token that includes including the attribute of the subject and using a bias determination engine at the computing machine, a bias in the text.

At block 612, the computing machine provides an output representing the determined bias.

According to some implementations, the bias determination engine includes at least one artificial neural network. The bias determination engine leverages a feature vector that includes the token(s) including the attribute of the subject and other tokens from a span of tokens in the text. The span of tokens includes token(s) including the attribute of the subject and other tokens.

According to some implementations, the bias determination engine determines the bias in the text based on the token(s) including the attribute of the subject being used in a stigmatizing context. The stigmatizing context or stigmatizing language may include language that takes at least one of three forms: (1) marking or labeling someone as other; (2) assigning responsibility (i.e., blame); and (3) invoking danger or peril. In the healthcare context, the stigmatizing context or stigmatizing language may include: patients with substance use disorders being labeled substance abusers; patients being described as noncompliant or poorly controlled, emphasizing patient responsibility for their illness; and distressed patients being called belligerent or combative or implying purposeful efforts to endanger healthcare staff.

According to some implementations, the bias determination engine determines the bias in the text in real-time when the text is generated.

According to some implementations, the computing machine provides, using a revision engine at the computing machine, a modification to the text that lacks the determined bias.

According to some implementations, the computing machine prompts a user of the computing machine to modify or delete at least a portion of the text to remove the determined bias. According to some implementations, prompting the user of the computing machine to modify or delete the at least the portion of the text comprises presenting a non-biased word or phrase for use in place of the at least the portion of the text, the word or the phrase being generated by a bias removal engine. The bias removal engine may access a set of neutral bias words and select a word from the set of neutral bias words for presentation to the user. The selected word may be selected using the artificial intelligence techniques described in conjunction with FIGS. 1-4 and based on analyses of publicly accessible texts (e.g., publicly accessible articles on the Internet) along with manually generated bias scores for parts of the publicly accessible texts. Alternatively, the bias removal engine may propose removing parts of the text. For example, in the text, "patient was aggressive . . . patient was admitted to the emergency room," the bias removal engine may propose removing the language "patient was aggressive," or suggest replacing the word "aggressive" with the word "upset" or another neural bias word. In yet another example, the bias removal engine may propose replacing the phrase "patient was aggressive" with a specific description of the patient's demeanor (e.g., "patient screamed and waved his arms").

According to some implementations, the computing machine identifies, using a plurality of records including the record, a pattern of bias by a subset of drafters generating the records against a subset of subjects associated with the records. The computing machine provides an output representing the identified pattern of bias.

According to some implementations, the computing machine compares the pattern of bias in records generated during a first time period with the pattern of bias in records generated during a second time period to determine changes in bias over time. The computing machine provides an output representing the changes in bias over time.

According to some implementations, the plurality of records are tagged based on membership of an associated subject in a first group and membership of an associated drafter in a second group.

According to some implementations, the record is a healthcare record, the subject is a patient, and the drafter is a clinician or another healthcare professional.

According to some implementations, the at least one token includes multiple attributes of the subject. The bias is determined based on a combination of the multiple attributes.

According to some implementations, the bias comprises an implicit bias determined based on the attribute. Implicit bias may include unconscious associations, beliefs, attitudes or stereotypes towards the subject or a group of people including the subject held by an author of the text.

According to some implementations, the bias represents a belief about a class of persons that includes the subject. The bias is selected from a set of biases that includes at least three members. The set of biases may include, for example: affinity bias, halo effect, perception bias, confirmation bias, and group think.

Figure 7:
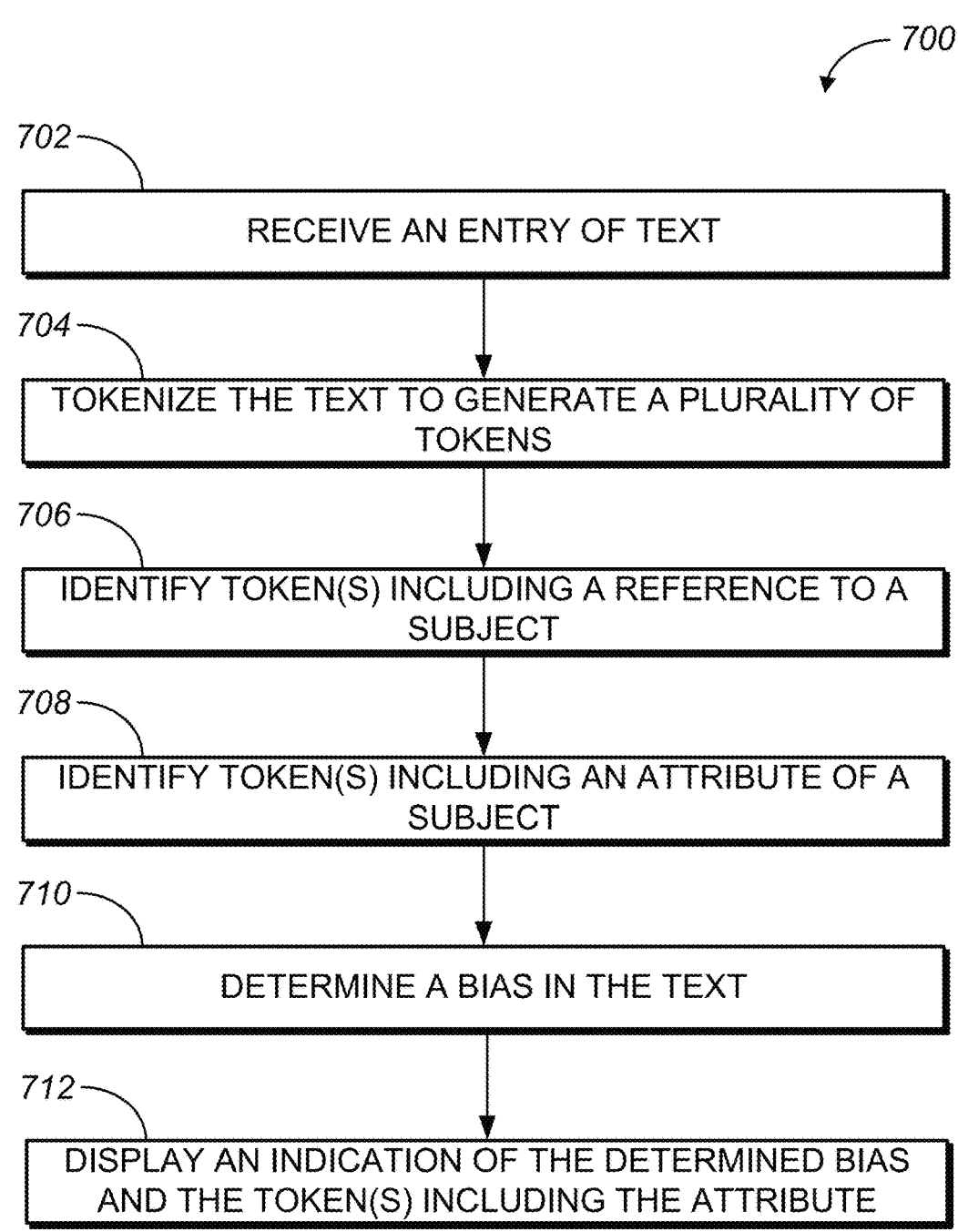
FIG. 7 is a flow chart of a second method of natural language processing for addressing bias, in accordance with some embodiments.

FIG. 7 is a flow chart of a second method 700 of natural language processing for addressing bias.

At block 702, a computing machine (e.g., computing machine 500) receives, via a graphical user interface, an entry of text.

At block 704, the computing machine tokenizes the text to generate a plurality of tokens.

At block 706, the computing machine identifies, from the plurality of tokens and using an entity classifier sub-engine of a natural language processing engine, at least one token including a reference to a subject.

At block 708, the computing machine identifies, from the plurality of tokens and using the natural language processing engine, at least one token including an attribute of the subject.

At block 710, the computing machine determines, based on at least one token that includes the attribute of the subject and using a bias determination engine, a bias in the text.

At block 712, the computing machine displays, via the graphical user interface, an indication of the determined bias and at least one token that was identified to include the attribute.

According to some implementations, the computing machine displays, via the graphical user interface, a prompt to modify the text to remove the bias. The prompt may include a proposed modification of the text lacking the bias. The proposed modification may be generated using artificial intelligence technology, for example, based on the technology described in conjunction with FIGS. 1-4. In some cases, the artificial intelligence technology for generating the proposed modification leverages a dictionary of neutral bias words, and replaces the tokens associated with the bias with words selected from the dictionary of neutral bias words. The words that are selected may be selected based on proximity of meaning to the tokens associated with the bias. The proximity of meaning may be computed by mapping each token and word to a vector associated with the meaning. In the mapping, word/tokens that are closer in meaning have a smaller distance between their associated vectors.

According to some implementations, the bias determination engine includes at least one artificial neural network. The bias determination engine leverages a feature vector including the token(s) that include the attribute of the subject and other tokens from a span of tokens in the text. The span of tokens includes the token(s) including the attribute of the subject and additional tokens adjacent to those token(s) or other token(s) of the span.

According to some implementations, the bias determination engine determines the bias in the text based on the token(s) including the attribute of the subject being used in a stigmatizing context.

According to some implementations, the indication of the determined bias and the token(s) including the attribute are displayed in real-time after the entry of text is received.

According to some implementations, the computing machine provides, using a revision engine, a modification to the text that lacks the determined bias.

According to some implementations, the entry of text is entered into a healthcare record, and the subject is a patient.

According to some implementations, the indication of the determined bias comprises emphasizing a portion of the text comprising the at least one token used to determine the bias and displaying text identifying the determined bias within a sidebar of the graphical user interface. Emphasizing the portion of the text may be done using multiple different techniques, for example, using bolding, italicizing or underlining, using a different font, drawing a box, an oval or another shape around the portion of the text, or the like.

Figure 8:
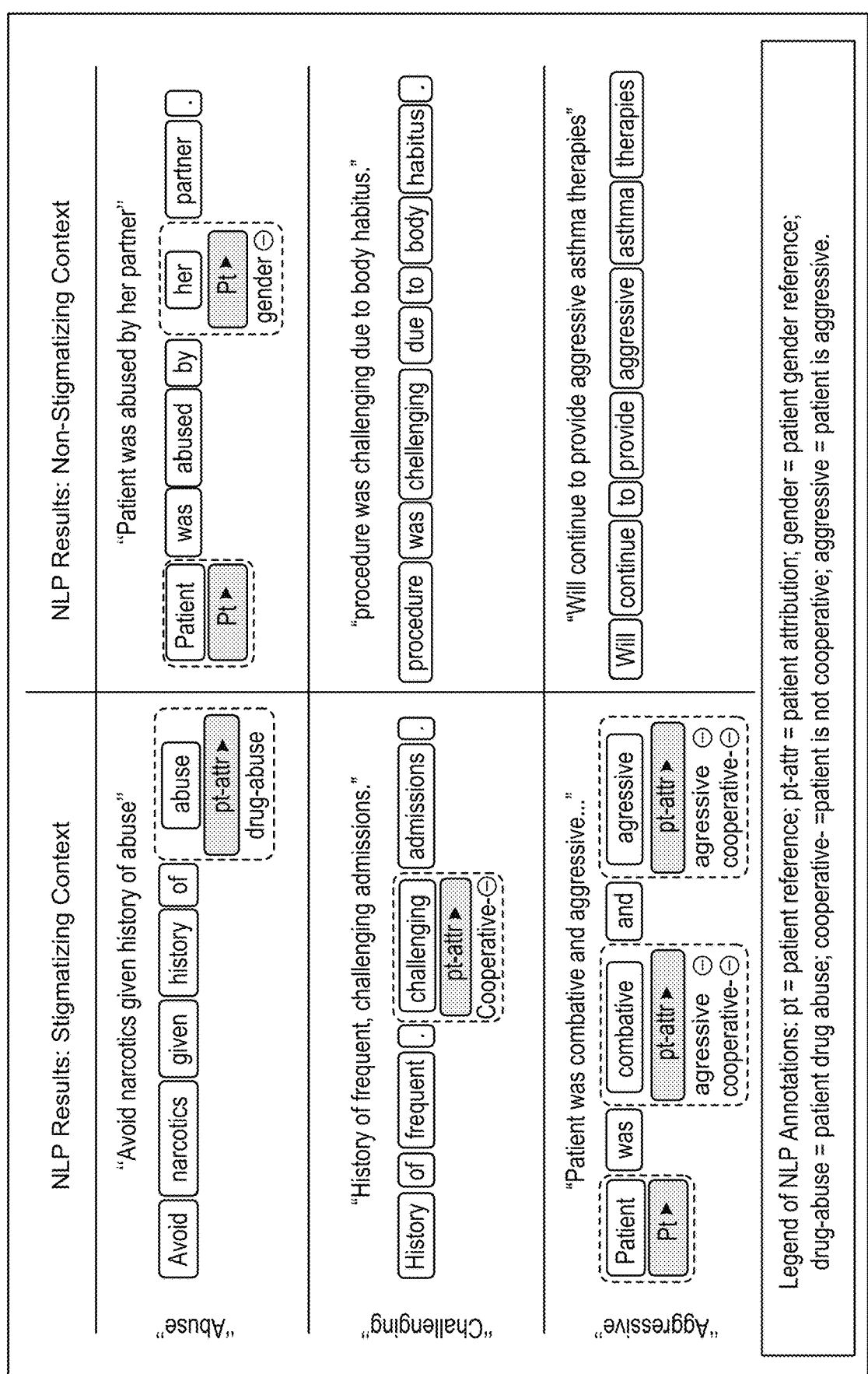
FIG. 8 illustrates an example of parsing text using natural language processing, in accordance with some embodiments.

FIG. 8 illustrates context-aware, span-based parsing with a transformer-based natural language processing architecture repurposed and retrained to assess clinical language bias. Each row includes a stigmatizing usage of a word (left column) and the same word (right column) used in a non-stigmatizing context. The presence of drug abuse, uncooperative, and aggressive labels only in the stigmatizing context, despite overlapping word usage may be noted.

Figure 9:
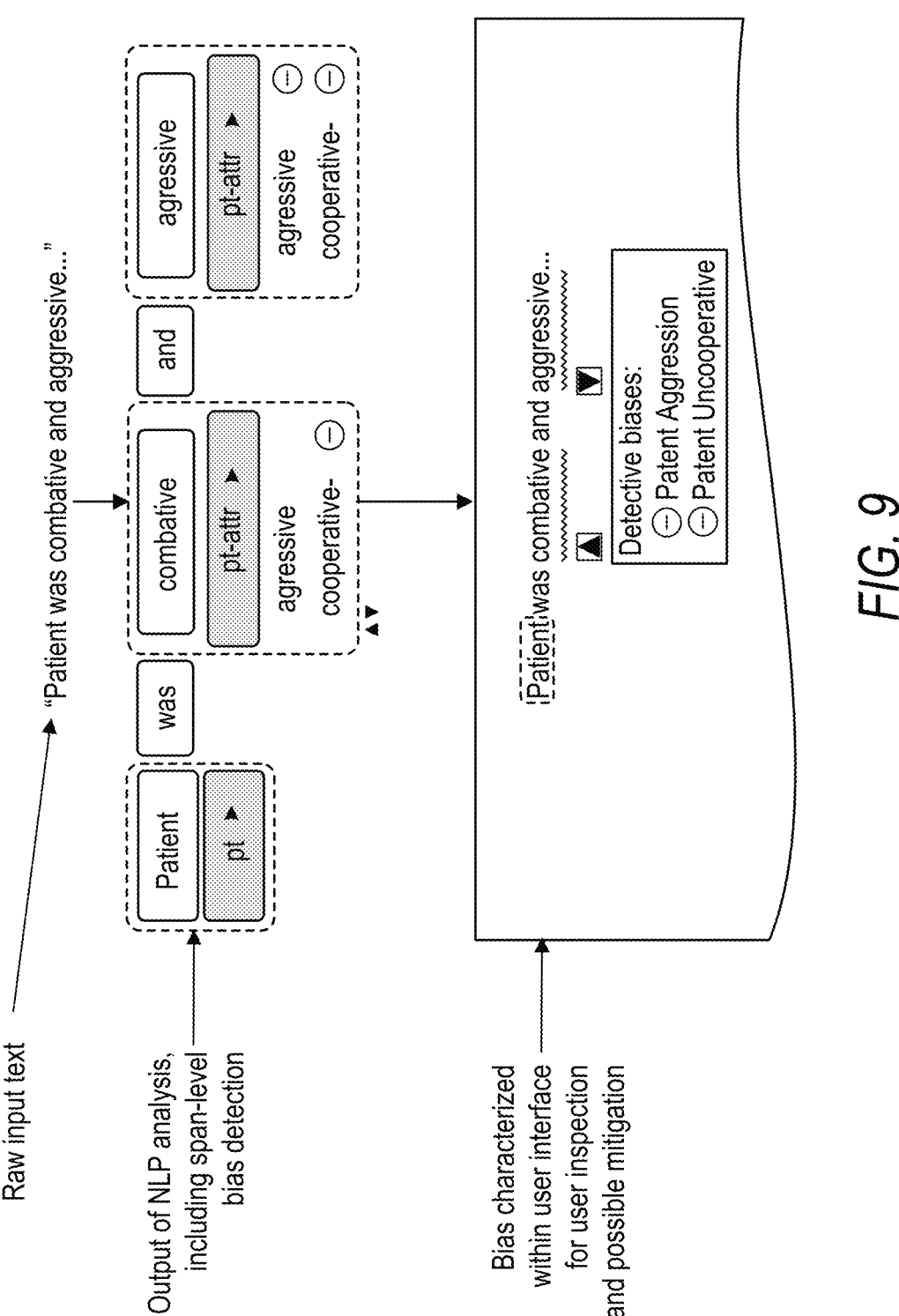
FIG. 9 illustrates an example of bias characterization using natural language processing, in accordance with some embodiments.

FIG. 9 illustrates an example of bias characterization using natural language processing. As shown, FIG. 9 includes a raw input text—"Patient was combative and aggressive." The output of the natural language processing (NLP) analysis includes identifying the token "patient" as the patient identifier (pt) and the tokens "combative" and "aggressive" as indicative of the patient having the attributes (pt-attr) of aggressive and not cooperative ("cooperative–"). The bias (of the tokens "combative" and "aggressive") is characterized within the user interface for user inspection and possible mitigation. For example, the user may choose to remove this entire phrase from the record and/or to modify the words "combative" and/or "aggressive."

The methods 600 and/or 700 may be preformed using an engine at a computing machine (e.g., the computing machine 500). The engine may be implemented in software and/or hardware. Training the engine may involve providing data and/or a "schema". The engine may takes (as input) a sentence (or any other collection of tokens) and may identify the "type" of token, any "properties" or "attributes" the token has, as well as "relations" between tokens. The output of the engine may be represented as a graph with nodes and edges, where each token-span corresponds to a node that has attributes. The edges may correspond to the relations. This allows some implementations to capture not only sentence level labels, but also span level and token level labels, as well as the determined relations. In order to train the engine, some implementations provide the engine with the universe of possible node "types" the engine can recognize as well as "attribute" and "edge" types. This is provided as a "schema". Once the engine has a schema and some annotated examples, the engine can be trained to generate graphs that satisfy the schema.

FIGS. 8-9 illustrate the node types and attributes. The schema may include two types of node/entities: (1) pt (patient) and (2) pt-attr (patient attribute). Each node/entity is attached to a token or a span of tokens. Each entity has an associated list of possible attributes: For example, the "pt" node has an attribute "gender", as shown in the "Patient was abused by her partner" block of FIG. 8. The gender attribute represents some property of the patient. "Gender" is just one example of an attribute. Other attributes may include "age", "ethnicity", and the like. The second node/entity shown in FIG. 8 is "pt-attr" which is meant to represent some behavioral (or other) attribute of the patient, which the clinician drafting the medical record is perceiving the patient to have. In some example, pt-attr may capture tokens like "challenging" or "combative". Similar to the "pt" entity, the "pt-attr" entity also has its own set of attributes. Examples of attributes of pt-attr may include "aggressive", "drug-abuse", and the like.

Some implementations specify the set of possible entities (pt, pt-attr) as well as attributes (aggressive, drug-abuse, gender), and also relations between the entities. The engine may be trained based on annotated examples of the schema to generate outputs or stored data similar to those shown in FIGS. 8-9. The above example of a schema is for illustrative purposes, and schemas containing other node types, attributes and relations can be provided without departing from the scope or spirit of the disclosure.

Some implementations leverage a transformer-based architecture. Transformers are a type of neural network architecture that may be used in NLP. When trained on large corpora of text, these transformers may include Large Language Models (LLM) or Masked Language Models (MLM). LLM or MLM architectures may include BERT (Bidirectional Encoder Representations from Transformers), its variants including RoBERTA, ALBERT, and others, XL-NET, and the like. As described herein, LLMs and MLMs are used in the English language. However, it should be noted that LLMs and/or MLMs may be used in other natural languages also. In some implementations, a LLM or MLM may be trained in a first natural language (e.g., French) and then modified for use in a second natural language (e.g., Spanish). In certain implementations, the LLMs or MLMs may be directly trained in several languages by concatenating data across different languages from the same or different sources. One example of such a multi-lingual MLM is M-BERT that has been pre-trained on the concatenation of monolingual Wikipedia corpora from 104 languages. In certain implementations, multi-lingual models like M-BERT allow for zero-shot cross-lingual model transfer whereby pre-trained multi-lingual model is fine-tuned in one language and evaluated or used in another language.

FIG. 10 is a block diagram of an example computer 1000 for natural language processing for addressing bias. The computer 1000 may correspond to the computing machine

500 and may include all or a portion of the components of the computing machine 500 described in FIG. 5. As shown, the computer 1000 includes a natural language processing engine 1002. The natural language processing engine 1002 includes an entity classification engine 1004 and an attribute identification engine 1006. The computer 1000 includes a bias determination engine 1008 that communicates with the natural language processing engine 1002 to identify bias (e.g., explicit bias or implicit bias). The computer 1000 may perform the method 600 or the method 700 using the natural language processing engine 1002 and/or the bias determination engine 1008.

In some examples, the computer 1000 accesses text from a record. The record may be stored in the memory of the computer 1000 or in a data repository (e.g., a database or other data storage unit) accessible to the computer 1000. The natural language processing engine 1002 tokenizes the text into multiple tokens, where each token represents a word, a part of a word (e.g., a prefix or a suffix), or a combination of words. The computer 1000 identifies, from the plurality of tokens and using the entity classifier engine 1004, at least one token including a reference to a subject. The subject may be a person being described in the text, for example, a patient associated with a medical record if the text is a medical record. The computer 1000 identifies, from the plurality of tokens and using the attribute identification engine 1006, at least one token including an attribute of the subject. The attribute may describe a perceived characteristic of the subject (e.g., cooperativeness or aggressiveness). The computer 100 determines, based on the at least one token including the attribute of the subject and using the bias determination engine 1008, a bias in the text. The computer provides an output representing the determined bias. The output may be presented in a sidebar and/or may include a suggestion for a user to edit the text to remove the bias.

In some examples, the computer 1000 receives, via a graphical user interface (GUI) of the computer 1000, an entry of text. For example, the entry may be generated by a medical professional adding information to a medical record. The computer 1000, via the natural language processing engine 1002, tokenizes the text to generate multiple tokens. The computer 1000 identifies, from the multiple tokens and using the entity classification engine 1004, at least one token including a reference to a subject. The token may include the name (e.g., "John Doe") or the title (e.g., "patient") of the subject. The computer 1000 identifies, from the multiple tokens and using the attribute identification engine 1006, at least one token including an attribute of the subject. The computer 1000 determines, based on the at least one token including the attribute of the subject and using the bias determination engine 1008, a bias in the text. The computer 1000 displays, via the GUI, an indication of the determined bias and the at least one token including the attribute. The at least one token may be emphasized (e.g., underlined, highlighted, boldened, or the like) within the text. Information about the determined bias and/or a suggestion for modifying the text to remove the determined bias may be presented within a sidebar of the GUI.

Each of the natural language processing engine 1002, the entity classification engine 1004, the attribute identification engine 1006, and the bias determination engine 1008 may be implemented using artificial intelligence techniques, for example, those described in conjunction with FIGS. 1-4. In one example, each of the natural language processing engine 1002, the entity classification engine 1004, the attribute identification engine 1006, and the bias determination engine 1008 includes at least one artificial neural network that is trained by supervised learning using a labeled dataset. The labeled dataset may be generated manually by a human or a team of humans.

Implicit bias in clinical language occurs frequently toward patients from minority populations. This may lead clinicians who read the biased notes to offer suboptimal care or pain management and/or reduce the trust and healthcare utilization of patients who read their own health charts. Some implementations may include software that uses NLP technology to detect and characterize language bias in clinical writing—potentially at the time of writing, like a grammar-check—to help clinicians and other healthcare users understand, study, correlate, and improve bias in language. By providing a window into—and a preventative measure against—implicit clinical language bias, some implementations may improve minority populations' quality of healthcare.

Some implementations relate to a software product intended for use by, among other people, clinicians, academic researchers, and clinical trial organizers, to characterize and improve language bias in clinical writing.

Some implementations may have manifestations, using natural language processing (NLP) technology. Some implementations provide a real-time tool for assessing bias in clinical language while it is written. Analogous to a grammar-checker, some implementations may highlight and characterize biased language, offering opportunities for clinicians to prevent stigmatizing language biases that correlate with minority populations and are associated with diminished patient care. Some implementations provide a retrospective analytic tool for clinicians and researchers to assess clinical language bias over time and correlate it with patient minority populations. This may help assess language biases in physician groups and healthcare systems. This may help measure changes in language bias over time, including the impact of Diversity, Equity, and Inclusion (DE&I) training interventions.

Some implementations may use context-sensitive NLP to provide context-sensitivity (e.g., automatically differentiating "difficult airway procedure" from the more stigmatizing "difficult patient demeanor"), identify biased text spans in context rather than identifying keywords or sentences, and predict how text might impact the sentiment and trust of specific minority populations by using NLP trained on cross-cultural population surveys.

One factor that perpetuates and exacerbates minority health disparities is implicit biases of clinicians—including underlying, often unconscious attitudes towards patients or patient populations—that negatively impact clinicians' decision-making and language about minority patients. Clinicians' implicit biases may result in language biases in their clinical notes. Patients from racial and ethnic minorities might, in some cases, be described as difficult, characterized as untrustworthy, or otherwise described with stigmatizing language. In some cases, implicit bias and language bias does not indicate bad intentions. Well-intentioned individuals may unintentionally propagate negative stereotypes when they describe minorities.

The language clinicians use in their notes may have impact on those that read the notes. For instance, clinicians' reading of stigmatizing language about patients may be associated with negative attitudes toward patients and suboptimal pain management. Furthermore, since patients now have broader access to their own medical records and clinicians' notes, the clinicians' language may impact patient anxiety and sense of control of their own health care, potentially in a culturally-sensitive fashion for different minority populations.

Some implementations plot some specific considerations (e.g., National Institute on Minority Health and Health Disparities (NIMHD) considerations) of clinical language bias in FIG. 9, where clinicians' notes within electronic medical records (EMRs) may contain minority-specific linguistic biases, resulting in two primary influences described below.

Clinicians who encounter biased language in medical records-which may correlate with minority patient populations—are more likely to provide suboptimal care. Language bias thereby impacts clinicians' preconceptions about patients in minority populations, ultimately affecting the specific considerations of patient-clinician relationship, the clinician's medical decision making, the quality of care, and other factors.

Patients who encounter biased language in their own medical records—or in the records of their family members—may interpret language in a fashion that varies across cultural identities and health literacy levels. In this fashion, biased language can impact minority populations' patient-clinician relationship, subsequent shared medical decision making, health literacy, and trust in the health system. Trust in the health system ultimately impacts minorities' decisions to participate in clinical trials, access vaccinations, and utilize healthcare services. This is a consideration for health systems as patients oftentimes have access their own charts.

Some implementations may use NLP to characterize bias in clinical language, and provide multiple interfaces, including a real-time live display to explore bias and adjust language.

In summary, improving language bias in clinical communications could substantially improve minority disparities in clinical treatment, and it is also important to characterize patient populations' bias in interpreting clinical language to improve their engagement with the health system. Addressing both sides of bias to jointly (1) characterize existing language bias and (2) improve and understand language bias in real-time—is an objective of some implementations.

Some implementations relate to the usage of context (e.g., surrounding words in a sentence) to detect and characterize language bias. FIG. 8 illustrates context-aware, span-based parsing with transformer-based NLP architecture repurposed and retrained to assess clinical language bias for some implementations. Each row includes a stigmatizing usage of a word (left column) from example medical record examples and the same word (right column) used in a non-stigmatizing context. Results are screen captures from running the NLP in the web-based NLP toolkit. Note the presence of drug abuse, uncooperative, and aggressive labels only in the stigmatizing context, despite overlapping word usage.

Some schemes are insensitive to context. These schemes would, for example, note the word "abuse" and flag both phrases "avoid narcotics given history of abuse" and "patient was abused by her partner," as displaying stigmatizing bias. However, as illustrated in FIG. 8, only "avoid narcotics given history of abuse" is stigmatizing as it suggests that the patient improperly used narcotics in the past.

Some implementations take plain text and identify spans of interest with one or more attributes to express the likely locale of implicit language bias. This might be distinct from sentence or word level granularity, and may focus on multiple words within a sentence, rather than a single word or a whole sentence.

Another consideration is the ability of the tool to generalize beyond the words and phrases that the clinicians or researchers encountered with when they labeled the data and trained the system.

Both word-stemming approaches and n-gram or "bag-of-words" approaches use words as elementary features. This means that "uncooperative" and "antagonistic" are only similar to these algorithms insofar as the algorithms have observed both words being used similarly in the training data; otherwise, if the algorithm has never encountered "antagonistic," then it has no unilateral bearing on bias detection, and the tool may fail to generalize. Clinical tools may accommodate novel or adjacent language to support multiple sites and providers.

The transformer-based NLP encodes language into contextual word vectors, starting from large pre-trained language models. This means that even if "antagonistic" has not appeared in the corpus, the pre-trained language model may encode it with a vector that is proximal to similar words. As evidence of this, a computer trained the clinical model with mentions of "uncooperative" and "difficult," but never "antagonistic," may still detect the proper bias category upon encountering the word "antagonistic" in a sentence, for example: "Patient was antagonistic upon entry to trauma bay."

Some implementations may include a reusable survey tool for engagement with populations across cultural identities to assess how exemplars of each linguistic bias category resonate with different physician and patient populations. This may allow some implementations to express not only the correlation of bias with patient populations, but also capture the valence and intensity of the bias as it might be interpreted by patients or clinical trial participants. This may help clinicians and clinical trial organizers understand—and potentially avoid—unintentional cultural hot-buttons in their clinical writing.

Some implementations have reviewed weaknesses in the present approaches to detecting clinical language bias and outlined how some implementations may overcome these weaknesses. Some implementations may benefit the customers—including clinicians, healthcare systems, clinical trial organizers, epidemiologists, technologists, and social scientists—by characterizing the occurrence, correlation, and interpretation of clinical language bias, and helping users improve unintended language bias in real-time.

There are multiple possible use cases for the disclosed technology. For clinicians authoring notes, some implementations' real-time bias-checking may assist by flagging language bias in clinical writing while they write—similar to a grammar-checker—to increase their awareness of bias in their language about the patient. The clinician may be able to assess which category of bias was detected and see how that category of bias correlates (and resonates) with different patient populations. This bias-checking yields multiple benefits. For example, the clinician benefits from increased awareness of language bias, potentially reducing future bias. If the clinician responds by adjusting their note to remove stigmatizing language, this could improve the patient's future encounters with other clinicians who read the note. It could likewise improve minority patients' interpretation of the note when they access it, ultimately improving their health literacy and trust in the healthcare system.

For healthcare system analysts, some implementations may give corporate and policy-based users a window into their EMRs to assess language bias with respect to correlated minority patient populations. This may help them explain or predict potential problems with patient-clinician relationships, shared medical decision-making, patient trust, and other NIMHD-relevant concerns.

For academic researchers, some implementations may increase the accessibility and fidelity of clinical language bias analysis. If academic users have better access to this technology, it could support a burst of academic publications about clinical language bias across sites.

For policymakers and educators evaluating the impact of new health policies, hiring practices, and DE&I training, some implementations can compare clinical language bias in EMRs before-and-after these changes to support comparative analytics. Some implementations may benefit these users with the ability to measure the impact of healthcare decisions and policies with respect to how minority populations are reported and regarded by their staff.

For clinical trial organizers authoring material to recruit or otherwise communicate with subject populations, some implementations may help flag language biases that may have unintended low sentiment or otherwise resonate poorly with specific minority populations. This may improve recruitment and retainment of minority populations in clinical trials, ultimately improving the validation and delivery of healthcare solutions to minority populations.

Some implementations provide practical, direct benefits to users, allowing them to understand and improve clinical language bias. If some implementations decouple the correlation of language bias with minority populations, and if it increases users' awareness of how language might be interpreted by healthcare customers across cultural identities, then this may improve minorities' quality of healthcare, patient-clinician relationships, shared decision-making, thereby supporting a broad, positive societal impact.

In summary, some implementations may help healthcare users achieve their missions while reducing language bias toward minority populations.

According to some implementations, the computer 1000 accesses text from a record. The computer 1000 identifies, using the natural language processing engine 1002 (e.g., the entity classification engine 1004 of the natural language processing engine 1002), an entity mapped to a first span of the text. A subword may include a part of a words, for example, a prefix or a suffix. A subword may include one or more tokens. The computer 1000 determines (e.g., using the bias determination engine 1008) a bias category for the entity. The bias category is selected from a predefined list of bias categories. The determined bias category for the entity depends on a second span of the text. The second span includes a contiguous sequence of one or more words or subwords in the text. The second span is different from the first span.

As used herein, the term "span" encompasses its plain and ordinary meaning. A span may include, among other things, a continuous and/or contiguous sequence of one or more words or subwords in the text. For example, in the sentence, "The man in the yellow hat rides the subway train to the office," the phrases "man," "man in the yellow hat," "the man in the yellow hat," "train," "subway train," "office," and "the office" all correspond to spans.

According to some implementations, the computer 1000 receives, via a GUI, an entry of text. The computer 1000 identifies, using the entity classification engine 1004 of the natural language processing engine 1002, a first span of text including a reference to a subject. The computer identifies, using the natural language processing engine 1002 (e.g., the attribute identification engine 1006 of the natural language processing engine 1002), a second span of the text including an attribute of the subject. The computer 1000 provides for display, via the GUI, an indication of the determined bias and the second span of the text. Providing for display may include displaying at a local display unit or transmitting for display at a remote display unit. Transmitting for display may include a transmitting from a server to a client.

The computer 1000 may be a client device that includes (or is directly connected to via a cable, for example, a high-definition multimedia interface (HDMI) cable) a display that presents the GUI. Alternatively, the computer 100 may be a server that communicates with a client device over a network. The GUI may be transmitted from the server to the client device for display at the client device, and input received via the GUI may be received at the client device and transmitted to the server for processing.

Some implementations relate to automatically extracting specific "bias categories" from raw text, for example, physician notes. These bias categories may include positive language categories and negative language categories. Positive categories include, among other things: compliment, approval, self-disclosure, minimizing blame, personalization, bilateral decision-making. Negative categories include, among other things: questioning credibility, disapproval, stereotyping, difficult patient, unilateral decisions. The bias categories may be detected from natural language using keywords or artificial intelligence-based natural language processing techniques. In some cases, the keyword-based approach might not take into account surrounding context. The keyword-based approach might not take into account the possibility of novel bias words. Thus, the keyword-based approach may have limited generalizability. Thus, if a machine (e.g., the computer 1000) automatically finds a known keyword in the text, the machine may flag the text as being biased, when contextually that keyword is not stigmatizing and, therefore, does not indicate bias. Also, if an unknown keyword is used, the keyword-based approaches would not be able to flag it. We are first people to use modern NLP techniques (neural network-based transformer architectures) to discover bias categories in spans of raw text, taking into account the context in which it is used, as well as allows the use of novel keywords. This is possible because, of the internal representation of the text as a vector in a high-dimensional space (distributional semantics), allowing us to change around other words (context) and the word meaning of a target word could change making it more or less biased. Similarly, novel words might be deemed biased based on their proximity in this high-dimensional vector space to known bias words.

Some implementations relate to automatically associating bias categories with demographic categories. Some implementations combine the use of bias categories with demographic categories of the person to whom the text refers (e.g., the subject of the text). A machine (e.g., the computer 1000) can determine a targeted bias towards a subgroup to which the subject of the text belongs by using statistical or artificial intelligence techniques.

FIG. 11 illustrates NLP analyses across levels of detail. The NLP architecture underlying some implementations uses machine learning (ML) techniques, and may apply these same techniques are applied in some implementations. The ML techniques may correspond to those described in conjunction with FIGS. 1-4.

Reproducible NLP practices may be focused around (1) generating datasets with reusable training and testing subsets to assess the quality of prediction, (2) preserving the configurations and hyperparameter settings alongside the datasets to reproduce and compare any findings throughout the effort, and (3) using well-defined metrics, such as F1 for predicting spans and attributes, and root mean square error (RMSE) for numerical predictions.

The experimental design for some implementations NLP—to measure its ability to correctly and broadly characterize clinical language bias—may include a standard train/test dataset split. Table 1 illustrates various ML concepts and their definitions.

TABLE 1

ML Concepts and their definitions.

| ML Concept | Definition |
|---|---|
| Schema | The schema defines the set of annotations or inferences the NLP system may make. For some implementations, this includes a set of span types (e.g., pt (patient) and pt-attr (patient attribute)) and span attributes (e.g., aggressive, gender, and cooperative) and constraints on which attributes can occur on which span types. |
| Example | A segment of text (i.e., sentence or paragraph of clinical language) that is eligible to be analyzed by the NLP system of some implementations. |
| Labeled Example | An example (above) with labels annotated over the text, to express different categories of language bias or sentiment scores. These labels are defined within the schema (above). |
| Expert-Labeled Example | An labeled example where the labels were generated by a human expert. These are used to train or test NLP machine-learning components. |
| Machine-Labeled Example | An labeled example where the labels were generated by NLP. Machine-labeled examples may be compared against expert-labeled examples to validate the NLP subsystem, or it may be used for subsequent statistical analysis. |
| Dataset | A set of expert-labeled examples. Some implementations build datasets to train and test the system. Some implementations archive datasets used to benchmark the system, for purposes of reproducibility. |
| Training Data | A subset of the dataset (i.e., expert-labeled examples) that is given to NLP component so it can learn how to produce the labels from the text using machine learning. |
| Testing Data | A subset of the dataset that is reserved or "held out" for testing purposes. After training NLP on the training data, it predicts the labels for the testing data, and computes the F1 score or RMSE to score its performance on the test. The examples in the testing data do not overlap with those in the training data. |

TABLE 1-continued

| ML Concept | Definition |
|---|---|
| NLP Architecture | The algorithm and software tooling that supports the training, execution, and configuration of the NLP model. Given the schema, training data, and configuration, the architecture produces a model that processes text to label examples automatically. |
| NLP Model | The component that processes text to predict (i.e., infer) the schema-defined labels on an unlabeled example. Some implementations train, compare, and validate multiple models to assess progress and improve the NLP components. |
| Configuration & Hyperparameters | The configuration of a ML architecture assigns values to one or more hyperparameters, such as the number of iterations of learning on the training data, learning rates, the size of its neural layers, and more. Some implementations may compare configurations to find the best setting for a NLP problem. The configuration files may be stored alongside all empirical results, for reproducibility. |

Some implementations aim to develop, validate, and apply an NLP tool to quantify and characterize implicit bias in the medical decision making (MDM) portion of emergency provider notes. This tool may shed light on this important factor in the development of health disparities, as well as allow for evaluating interventions to address such implicit bias.

Some implementations relate to a collection of patient regard categories (PRCs), where each category represents a distinct (positive or negative) social or medical attribution to a patient. PRCs may include pleasant, unpleasant, knowledgeable, drug-seeking, over-reacting, or the like. Some implementations relate to a dataset of labeled MDMs, where instances of each PRC are annotated within the text by a combination of NLP specialists and medical professionals. For instance, the phrase "This well-mannered patient . . . " may be annotated with the pleasant PRC as "This [PLEASANT]well-mannered patient . . . " Some implementations relate to a prototype NLP tool that automatically detects PRCs and characterizes physician sentiment in MDM texts. PRC detection may be measured by F1 score on a held-out test set from the labeled MDM dataset. Some implementations relate to a preliminary assessment that uses the NLP tool to characterize how sentiment and PRCs correlate with patient race, ethnicity, age, sex, and acuity of presentation. If the frequency of PRCs (e.g., instances of pleasant or unpleasant) correlate with patient demographics, this could indicate implicit bias toward those demographics.

TABLE 2

Example metrics that may be used with NLP

| NLP Metric | Definition |
|---|---|
| Precision | Precision is a real number from [0 . . . 1] expressing the fraction of examples predicted-as-positive that were actually-positive. This is a measure of correctness of the predictions. Precision may be used to measure NLP quality. |
| Recall | Recall is a real number from [0 . . . 1] expressing the fraction of actually-positive examples that were predicted-as-positive. This is a measure of completeness or coverage of the predictions. Recall may be used to measure NLP quality. |
| F1 | F1 score, also known as the F-measure or balanced F-score, is a real number from [0 . . . 1] expressing the harmonic mean of precision and recall. This therefore accounts for both the predictive correctness and the predictive coverage. Compute it as: |

TABLE 2-continued

Example metrics that may be used with NLP

| NLP Metric | Definition |
|---|---|

$$F = 2 * \frac{precision * recall}{precision + recall} \quad (1)$$

| | |
|---|---|
| Micro-F1 | When both precision and recall are 1.0, F = 1.0. When either are 0.0, F = 0.0. When both are 0.0, F is undefined. Micro-F1 is a real number from [0 . . . 1] expressing the average F1 score over multiple labels, e.g., to summarize the F1 scores of a detector of aggression instances and drug-abuse instances, and others in a single value. It is computed by micro-averaging the F1 scores of each label, weighting each label by frequency, so if aggression occurs twice as much as drug-abuse, it would have double the weight. Use micro-F1 to summarize the effectiveness processing an entire dataset. |
| Accuracy | Accuracy is a real number from [0 . . . 1] (often reported as a percent) expressing the fraction of the time a prediction was correct. Note that this is a poor measure for NLP datasets that are unbalanced (i.e., have rarely-occurring positives), since one can achieve high accuracy by always guessing "no." Consequently, one may only use accuracy for a balanced dataset, where chance is 0.5; otherwise one may use F1 measure for unbalanced datasets. |
| RMSE | RMSE (root mean squared error) is a real number expressing the error between predicted and actual values, when predicting a real number such as a sentiment rating or an intensity score. One computes it by squaring the difference of each prediction to the actual value for each predicted $p_i$ and actual $a_i$ value in the dataset of n items: |

$$RMSE = \sqrt{\frac{\sum_{i=1}^{n} (r_i - a_i)^2}{n}} \quad (2)$$

| | |
|---|---|
| | One may use RMSE to measure the performance of regression models in NLP, where the model may predict a sentiment score or intensity score of a sentence or span. |
| Training Dataset Size | The number of examples used for training the NLP model. All else being equal, favorable F1 is desirable with fewer training examples, since examples can be monotonous to label. A product may be more viable if it takes fewer examples to train or update. |

One use case may include collecting retrospective emergency chart documentation by physicians and advanced practice providers from their emergency department notes at emergency departments. A dataset may be generated to include patient encounters of patients who provide affirmative consent for placement of their data into the dataset.

The emergency department provider's MDM portion of the chart may be abstracted from the chart along with basic demographic information (age, race, ethnicity, insurance status), and a measure of encounter acuity (using the Emergency Severity Index, ESI). The MDM is the portion of the chart that contains the overall evaluation of the patient—including both objective statements (physical examination findings, pertinent laboratory values, radiology interpretations, historical elements, etc.) and subjective statements (an overall evaluation of the patient's condition, interpretations of laboratory/radiology results, final impressions/diagnoses of the patient, etc.). The MDM may be an important portion of the chart used to inform other providers taking over the care of the patient moving forward. All personally identifiable information may be removed from the MDMs prior to analysis. One may then proceed to use the data to develop the NLP tool based on patient regard categories (PRCs), evaluate the tool using the dataset, and finally apply the tool to additional unlabeled data to characterize implicit bias.

From the corpus of MDMs, one may randomly sample a subset as our development set, which our medical experts and NLP expert may read and collaboratively identify relevant PRCs to track using the tool. The NLP expert and medical experts may then cooperatively label spans of text in the development set and a larger randomly-sampled subset of the data and may adjust the PRCs as necessary for consistency and medical relevance. From the set of labeled data, one may generate the training set and validation set, so the NLP tool may use machine learning to induce a linguistic model for the training set, and then one may evaluate its precision, recall, and F1 score using the held-out validation set (a measure of test accuracy).

Figure 12:
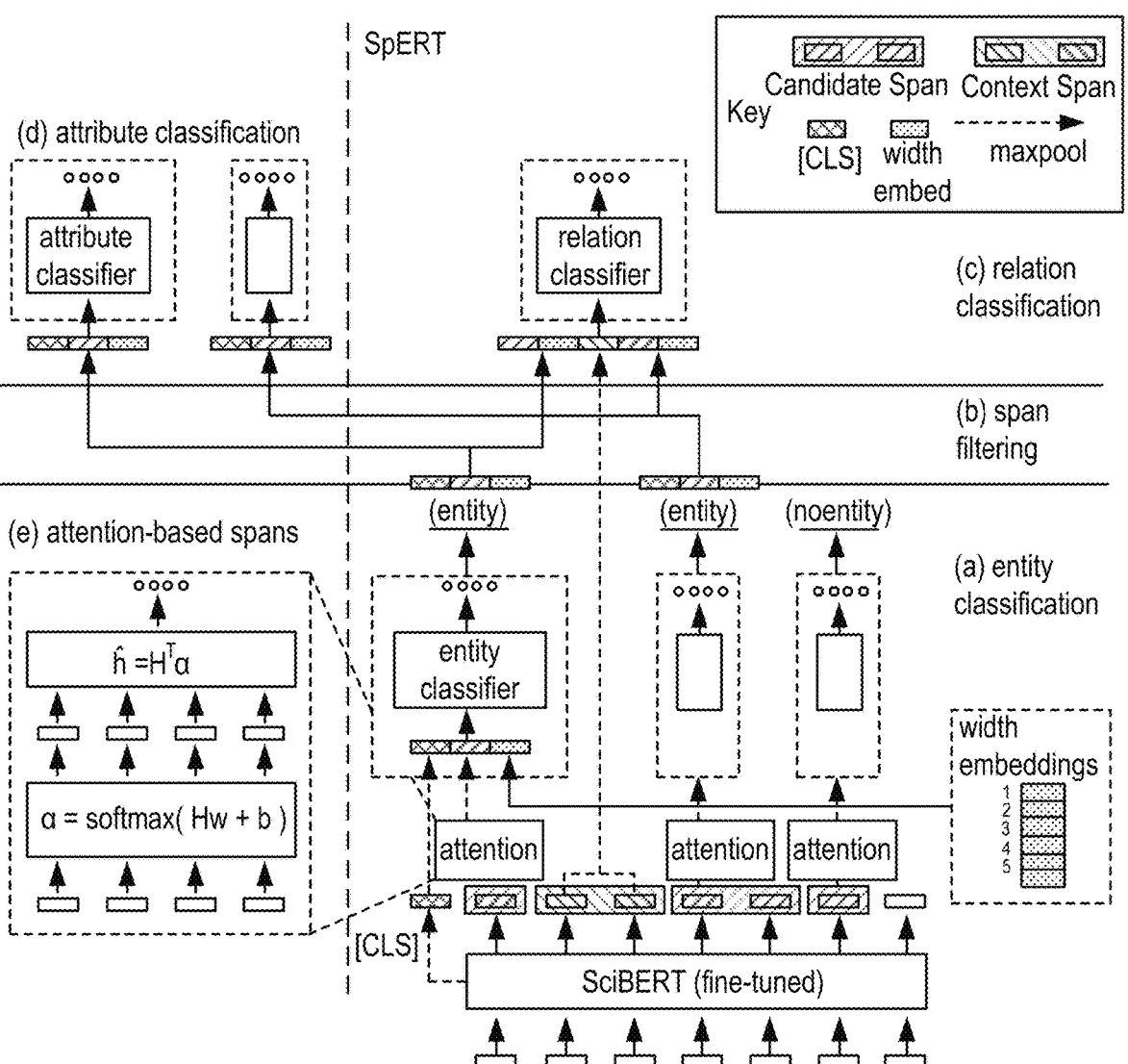
FIG. 12 illustrates an example natural language processing architecture, in accordance with some embodiments.

FIG. 12 illustrates an example natural language processing architecture. The architecture of FIG. 12 is based in part on SpERT (Span-based Joint Entity and Relation Extraction with Transformer Pre-training) and enhancements for attribute-labeling and attention-based encoding.

The data may be analyzed differently in the testing set versus the validation sets. The former may be used to evaluate our NLP tool's ability to detect PRCs, in which one may measure its precision (i.e., soundness), recall (i.e., completeness), and F1 measure (harmonic mean of precision and recall), which are standard NLP metrics. This may ultimately establish its usefulness to detect implicit bias in the medical record, as is the aim of the study. Once the tool is validated, one may characterize the statistical interaction of PRC frequency with patient demographics in the validation set. (1) log-odds-ratio and p-value may be used to relate PRC occurrence with categorical demographics such as race (white, Black, and non-white), and (2) R-squared measure and p-value may be used to relate PRC occurrence with continuous demographics such as age.

Qualitative causal relationships compactly express the direction, dependency, temporal constraints, and monotonicity constraints of discrete or continuous interactions in the world. In everyday or academic language, one may express interactions between quantities (e.g., sleep decreases stress), between discrete events or entities (e.g., a protein inhibits another protein's transcription), or between intentional or functional factors (e.g., hospital patients pray to relieve their pain). Extracting and representing these diverse causal relations are critical for cognitive systems that operate in domains spanning from scientific discovery to social science. Some implementations relate to a transformer-based NLP architecture that jointly extracts knowledge graphs including (1) variables or factors described in language, (2) qualitative causal relationships over these variables, (3) qualifiers and magnitudes that constrain these causal relationships, and (4) word senses to localize each extracted node within a large ontology. The transformer-based architecture may or may not be itself a cognitive system. However, one provides evidence of its accurate knowledge graph extraction in real-world domains and the practicality of its resulting knowledge graphs for cognitive systems that perform graph-based reasoning. This approach may include results in use cases of processing textual inputs from academic publications, news articles, social media, or the like.

People express causal relationships in everyday language and scientific texts to capture the relationship between quantities or entities or events, compactly communicating how one event or purpose or quantity might affect another. These causal relations are not complete mechanisms in themselves, but one use them frequently in everyday language and formal instruction to express causality, allowing us to avoid unnecessary detail or to hedge when details are uncertain.

Identifying these causal relationships from natural language—and also properly identifying the actors that they relate—remains a challenge for cognitive systems. This difficulty is due in part to the expressiveness of our language, for example, the multitude of ways one may describe how an experimental group scored higher on an outcome than a control group, and also due to the complexity of the systems being described.

Some implementations relate to automatically extracting (1) entities that are the subject of causal relationships, (2) causal relationships describing mechanisms, intentions, monotonicity, and temporal priority, (3) multi-label attributes to further characterize the causal structure, and (4) ontologically-grounded word senses for applicable nodes in the causal graph. Context-sensitive language models may detect and characterize the qualitative causal structure of everyday and scientific language in a representation that is usable by cognitive systems. As evidence, one present our SpEAR (Span-based Joint Entity and Relation) transformer-based NLP model based on BERT (Bidirectional Encoder Representations from Transformers) and SpERT that extracts causal structure from text as knowledge graphs, and one present promising initial results on (1) characterizing scientific claims and (2) representing and traversing descriptive mental models from ethnographic texts.

Some implementations infer causal, functional, and intentional relational structure, so its output knowledge representations are relevant to cognitive systems; however, the NLP methodology that performs the inference is, in some cases, not intended to model human cognition. The nodes within the causal, semantic graphs produced by SpEAR link to the WordNet word sense hierarchy to facilitate subsequent reasoning. Unlike rule-based parsers that use ontological constraints during the parsing process, the NLP architecture may, in some cases, infer ontological labels as a context-sensitive post-process. The knowledge representations inferred by some implementations allow traversal across concepts to characterize meaningful causal influences.

Qualitative proportionalities describe how one quantity impacts another, in a directional, monotonic fashion. According to some implementations, [a, q+, b] (and respectively, [a, q−, b]) are designated as qualitative proportionalities from a to b, such that increasing a would increase (and respectively, decrease) b. This is motivated by quantity-to-quantity $\alpha Q+/-$ relations and M+/− relations in qualitative simulation. The semantics may be less constrained than either of these, due to tendencies in language to express an increase from an event to a quantity (e.g., "smoking a cigarette may increase your risk of cancer") or from entities to activities (e.g., "the prime increased participants' retrieval of the cue"), and so on.

Intentional (i.e., psychological, goal-based) and teleological (i.e., functional, design-based) relationships as types of causal relations. These may be represented as lexical qualia or affordances. Purposeful, intentional actions may be represented as a qualitative relationship [a, intent+, b], such that the actor of action a may have intended the purpose or goal b, e.g., "they prayed for a safe pregnancy." Teleological (i.e., functional or design-based) causal relations may be represented as [a, function+, b] to indicate that the action or artifact a is designed or otherwise has a function to achieve b, e.g., "the artifacts provide protection for pregnant women."

Figures 13A, 13B:
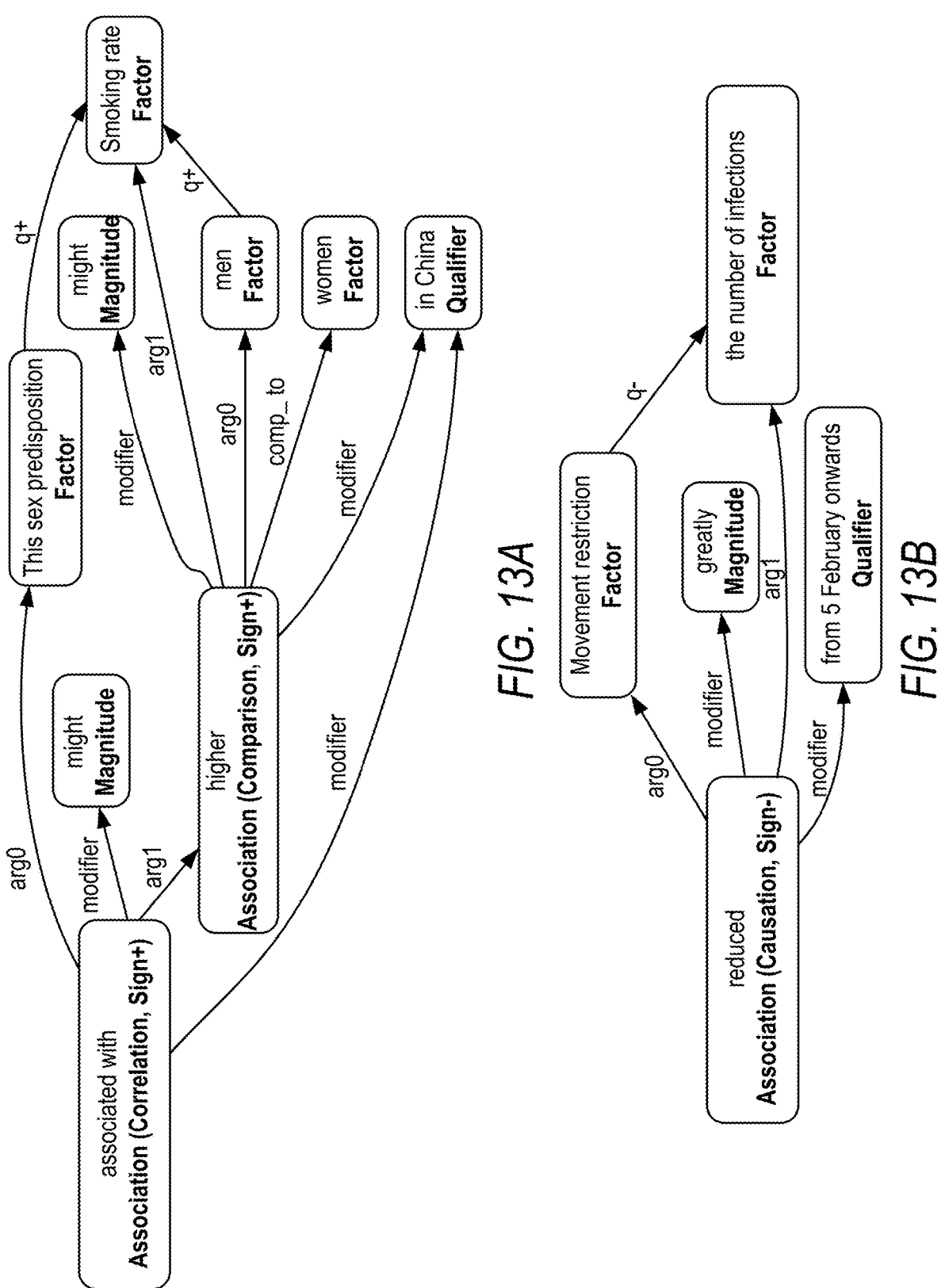
FIGS. 13A-13B illustrate first example knowledge graphs, in accordance with some embodiments.

FIGS. 13A-13B illustrate example knowledge graphs. FIG. 13A illustrates a SpEAR knowledge graph output for the text "This sex predisposition might be associated with the much higher smoking rate in men than in women in China." This text includes a correlation, a comparison with a qualitative increase, magnitudes, and a location qualifier. FIG. 13B illustrates a SpEAR knowledge graph output for "Movement restriction greatly reduced the number of infections from 5 February onwards." This text includes a causal association, a qualitative decrease, a magnitude, and a temporal qualifier.

Transformer-based methods for NLP utilize neural networks to encode a sequence of textual tokens (i.e., words or sub-words) into large vector-based representations for each token, sensitive to the context of the surrounding tokens. This is a methodology for NLP, and may be used to process text to extract knowledge graphs, e.g., of people and relations. Many transformer models may use hundreds (sometimes thousands) of labeled training examples to reach high proficiency, for example, using the techniques described in conjunction with FIGS. 1-4.

Symbolic semantic parsers extract assertions from text with explicit relational knowledge representations. The parsers may rely on rule-based engines with hand tuning, which provides more customization and interpretability, at the expense of using NLP experts to maintain and adapt to new domains. By contrast, some implementations extract causal knowledge graphs using advances in transformer-based models such as SpERT to learn graph-based representations from examples. The resulting knowledge graphs are ontologically-grounded and support graph-based reasoning.

Some NLP approaches use machine learning to extract features from texts, for example, to identify factors and directions of influence in assertions made in the texts. These approaches might not explicitly infer relations between elements in a causal graph or the ontological groundings of the terms. One technique disclosed herein explicitly infers relations between elements in a causal graph or the ontological groundings of the terms.

Some implementations relate to graph schema for representing the entities, attributes, and qualitative relationships extracted from text.

The SpEAR knowledge graph format includes the following three types of elements: entities, attributes, and relations. These are described below.

Entities are labeled spans within a textual example. These are the nodes in the knowledge graph. The same exact span cannot correspond to more than one entity type, but two entity spans can overlap. Entities may include the nodes upon which attributes and relations are asserted. Unlike most ontologically-grounded symbolic parsers, these entity nodes are not ontologically grounded in a class hierarchy. Rather, these entity nodes are associated with a token sequence (e.g., "smoking rate" in FIG. 13A) and a corresponding entity class (e.g., Factor). These entities also have high-dimensional vectors from the transformer model, which approximates the distributed semantics.

Attributes are Boolean labels, and each entity (i.e., graph node) may have zero or more associated attributes. Attribute inference is therefore a multi-label classification problem. In FIGS. 13A-13B, attributes are rendered as parenthetical labels inside the nodes, e.g., Correlation and Sign+ in the FIG. 13A nodes for "associated with" and "higher," respectively. The multi-label nature allows the FIG. 13A "higher" node to be categorized simultaneously as Sign+ and Comparison.

Relations are directed edges between labeled entities, representing semantic relationships. These are critical for expressing what-goes-with-what over the set of entities. For example in the sentence in FIG. 13A, the relations (i.e., edges) indicate that the "higher" association asserts the antecedent (arg0) "men" against (comp_to) "women" for the consequent (arg1) "smoking rate." In FIGS. 13A-13B, the modifier relations link nodes to others that semantically modify them. Without all of these labeled relations, the semantic structure of these scientific claims would be ambiguous.

Some implementations define the multi-attribute knowledge graph extraction task as follows: for a text passage S of n tokens $s_1, \ldots, s_n$, and a schema of entity types $T_e$, attribute types $T_a$, and relation types $T_r$, predict: (1) The set of entities $<s_j, s_k, t \in T_e > \in \varepsilon$ ranging from tokens $s_j$ to $s_k$, where $0 \le j \le k \le n$, (2) The set of relations over entities $<e_{head} \in \varepsilon, e_{tail} \in \varepsilon, t \in T_r > \in R$ where $e_{head} \ne e_{tail}$, and (3) The set of attributes over entities $<e \in \varepsilon, t \in T_a > \in A$. This defines a directed multi-graph without self-cycles, where each node has zero to $|T_a|$ attributes. SpEAR does not presently populate attributes on relations.

Figure 14:
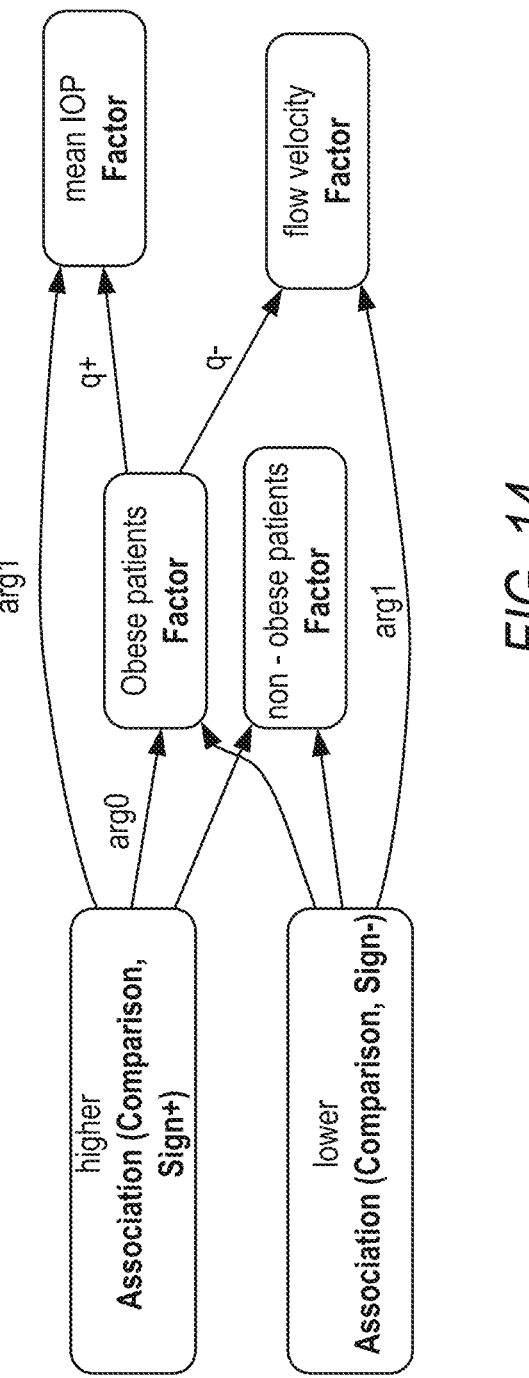
FIG. 14 illustrates a second example knowledge graph, in accordance with some embodiments.

FIG. 14 illustrates a SpEAR knowledge graph output for "Obese patients have a higher mean IOP (intraocular pressure) and lower flow velocity than non-obese patients." The two qualitative comparisons "higher" and "lower" support qualitative Sign+ and Sign− attributes, and q+ and q− relations, respectively.

Some implementations briefly describe a subset of the graph schemas for our two use-cases: (1) the SciClaim dataset of scientific claims and (2) ethnographic mental models. These two schemas share some qualitative causal representations but vary in other domain-specific descriptions.

For scientific claims, one schema is designed to capture associations between factors (e.g., causation, comparison, prediction, proportionality), monotonicity constraints across factors, epistemic status, and high-level qualifiers. This model is used for qualitative reasoning to help characterize the replicability and reproducibility of scientific claims.

This schema includes six entity types: Factors are variables that are tested or asserted within a claim (e.g., "smoking rate" in FIG. 13A). Associations are explicit phrases associating one or more factors in a causal, comparative, predictive, or proportional assertion (e.g., "associated with" and "reduced" in FIG. 13A and FIG. 13B, respectively). Magnitudes are modifiers of an association indicating its likelihood, strength, or direction (e.g., "might" and "much" in FIG. 13A). Evidence is an explicit mention of a study, theory, or methodology supporting an association. Epistemics express the belief status of an association, often indicating whether something is hypothesized, assumed, or observed. Qualifiers constrain the applicability or scope of an assertion (e.g., "in China" in FIG. 13A and "from 5 February onwards" in FIG. 13B).

This schema includes the following attributes, all of which apply to the association entities: Causation expresses cause-and-effect over its constituent factors (e.g., "reduced" span in FIG. 13B). Comparison expresses an association with a frame of reference, as in the "higher" statement of FIG. 13A and the "higher" and "lower" statements of FIG. 14. Sign+ expresses high or increased factor value. Sign– expresses low or decreased factor value. Indicates expresses a predictive relationship. Test indicates a statistical test employed to test a hypothesis.

Six relations may be encoded. Arg0 relates an association to its cause, antecedent, subject, or independent variable. Arg1 relates an association to its result or dependent variable. Comp_to is a frame of reference in a comparative association. Modifier relates entities to descriptive elements, and q+ and q– indicate positive and negative qualitative proportionality, respectively. Increasing the head factor increases or decreases (the amount or likelihood of) the tail factor, respectively.

In an ethnographic mental modeling domain, some implementations utilize a slightly different schema to capture intentional and functional causality in addition to culturally-specific attributes such as gender and spirituality.

Figures 15A, 15B:
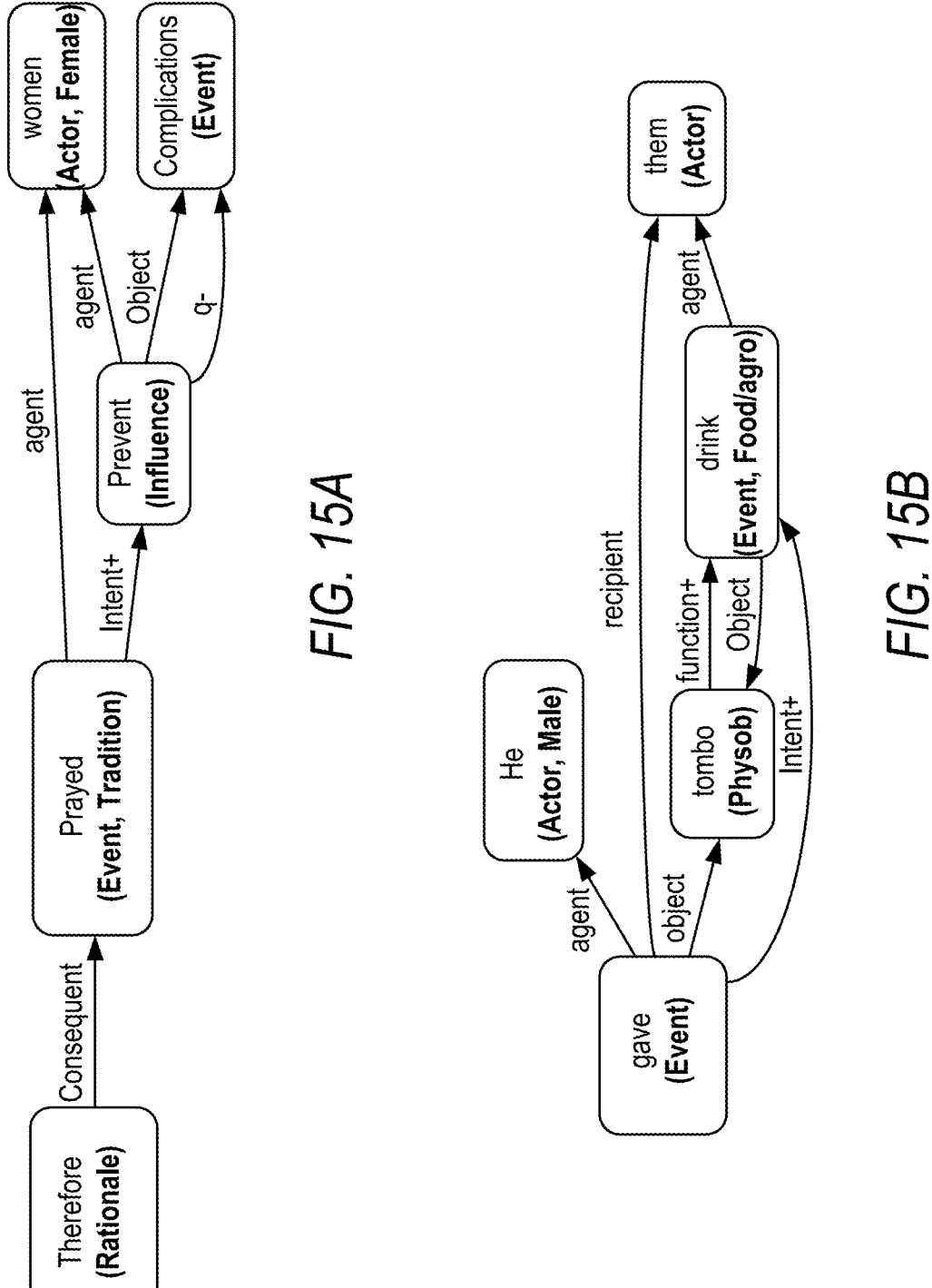
FIGS. 15A-15B illustrate third example knowledge graphs, in accordance with some embodiments.

FIGS. 15A-15B illustrate example knowledge graphs. FIG. 15A is a SpEAR knowledge graph for "Therefore, the women prayed to prevent any complications," including intent+ and q– relations. FIG. 15B is a SpEAR knowledge graph for "He also gave them tombo to drink.", including intent+ and function+ relations. The SpEAR knowledge graphs illustrate rich multi-step causality. FIG. 15A indicates that prayer has the purpose of reducing the incidence (or severity of) complications. FIG. 15B plots a simple narrative structure indicating an agent's intention to affect the actions of other agents, as well as the function of a novel entity.

This schema includes attributes for spiritual or cultural Tradition (e.g., "prayed" in FIG. 15A), Event (e.g., "gave" and "drink" in FIG. 15B), Influence for causally-potent elements (e.g., "prevent" in FIG. 15A), and others. Some implementations include additional relations agent, object, recipient, consequent, and others as semantic role relations of events and assertions. These relations (rendered in narrow lines in FIG. 15A and FIG. 15B) comprise a description logic of their head nodes, such that the head node would not have the same semantics without the reachable subgraph along these edges.

The bold-rendered edges are causal edge, including qualitative monotonicity q+ and q–, temporal precedence t+ relations to indicate one event preceding another, and intentional intent+ and functional function+ relations to indicate the goal (i.e., intention or function, respectively) of an action or artifact. For instance, the graph in FIG. 15A shows an intent+ from "prayed" to "prevent" and then a q- to "complications", ultimately indicating that prayer has a goal of minimizing complications. Furthermore, the graph in FIG. 15B illustrates an intent+ relation from "gave" to "drink," indicating the giving is intended to support the drinking. FIG. 15B also includes a function+ relation, indicating that the "tombo" is designed or cultivated for drinking.

The SpEAR model architecture extends SpERT with an attribute classifier and attention-based span representation. The architecture provides components for joint entity and relation extraction on potentially-overlapping text spans. The parameters of the entity, attribute, and relation classifiers, as well as the parameters of the BERT language model (initialized with its pre-trained values) are all trained end-to-end on the dataset.

FIG. 12 illustrates a SpEAR transformer-based model that extends the SpERT components with attribute classification that performs multi-label inference on identified entity spans and attention-based representations of spans.

The tokens $s_1, \ldots s_n$ of the text passage S are each embedded by a transformer such as BERT as a sequence $e_1, \ldots, e_n$ of high-dimensional vectors representing the token and its context. BERT also provides an additional "[CLS]" vector output, $e_0$, designed to represent information from the complete text input. For all possible spans, $span_{j,k}=S_j, \ldots, s_k$, up to a given length, the word vectors associated with a span, $e_j, \ldots, e_k$, are combined into a final span vector, $e(span_{j,k})$.

The original SpERT architecture uses maxpooling to compute each dimension of $e(span_{j,k})$ as the maximum value across its constituent BERT token vectors for that dimension. Instead of using maxpool, SpEAR uses an attention-based span representation to compute span vectors. This produces attention weight scalars $\alpha_{i,t}$ for each BERT token vector $h_t$ in a span i using learned parameters w and b.

$$\alpha_{i,t} = \frac{\exp(w \cdot h_t + b)}{\sum_{k=START(1)}^{END(i)} \exp(w \cdot h_k + b)} \tag{1}$$

These attention weights help compute the span representation $\hat{h}_i$ with the following weighted sum.

$$\hat{h}_i = \sum_{t=START(1)}^{END(i)} \alpha_{i,t} h_t \tag{2}$$

The final attention-based span representation, $x(span_{j,k})$ is made by concatenating together the attention representation $e(span_{j,k})$ and $e_0$ along with a width embedding, $w_l$, that encodes the number of words, l, in $span_{j,k}$. Each valid span length l looks up a different vector of learned parameters, $w_l$. SpEAR uses the concatenated $x(span_{j,k})$ vector to classify spans into mutually-exclusive entity types (including a null type) using a linear classifier. Spans identified as entities move on to further analysis.

SpEAR uses its classified entities $x^a$ as inputs to its attribute classifier with weights $W^a$ and bias $b^a$. A pointwise sigmoid $\sigma$ yields separate confidence scores $\hat{y}^a$ for each attribute in the graph schema.

$$\hat{y}^a = \sigma(W^a x^a + b^a) \tag{3}$$

Some implementations train the attribute classifier with a binary cross entropy loss $L_a$ summed with the SpERT entity and relation losses, $L_e$ and $L_r$, for a joint loss.

$$\mathcal{L} = \mathcal{L}_e + \mathcal{L}_r + \mathcal{L}_a \tag{4}$$

In some cases, SpEAR takes identified entity spans as input to the attribute classifier. This approach provided best performance that training on downstream tasks yields. Some datasets include strong negative samples of ground truth entities (i.e., teacher forcing).

In some cases, SpEAR uses all pairings of classified entities as inputs to its relational classifier. SpEAR's relational classifier identical to SpERT's: a multi-label linear classifier that takes each pair of entities (i.e., a relation head and a relation tail) and concatenates their span representations, width representations, and the maxpool of the token vectors between the two entities. The output of the relational classifier is zero or more labeled relations from the head entity to the tail entity.

The output of SpEAR's neural components comprises a directed multigraph (i.e., a directed graph that is allowed to have multiple edges between any two nodes) without self-loops. The multigraph may be disconnected, and may contain isolated nodes. Each node (i.e., labeled entity) in the multigraph may have zero or more Boolean attributes. Every entity, attribute, and relation in SpEAR's directed multi-graphs includes a confidence score between 0 and 1.

SpEAR may include a novel rectifier component that prunes entities, attributes, and relations that are inconsistent with the constraints of the graph schema. For example, relations might be constrained to originate or terminate at certain entity types, attributes may be constrained to certain entity types, and some attributes and relations may be mutually inconsistent.

When the rectifier detects a schema conflict, it uses SpEAR's confidence scores to remove lower-score elements to resolve it. This strictly removes graph elements, so it cannot improve SpEAR's recall score—and it may even reduce the recall score—but empirically, some implementations find the rectifier increases precision proportionately and ultimately increases SpEAR's F1 measure in some domains.

Figure 16:
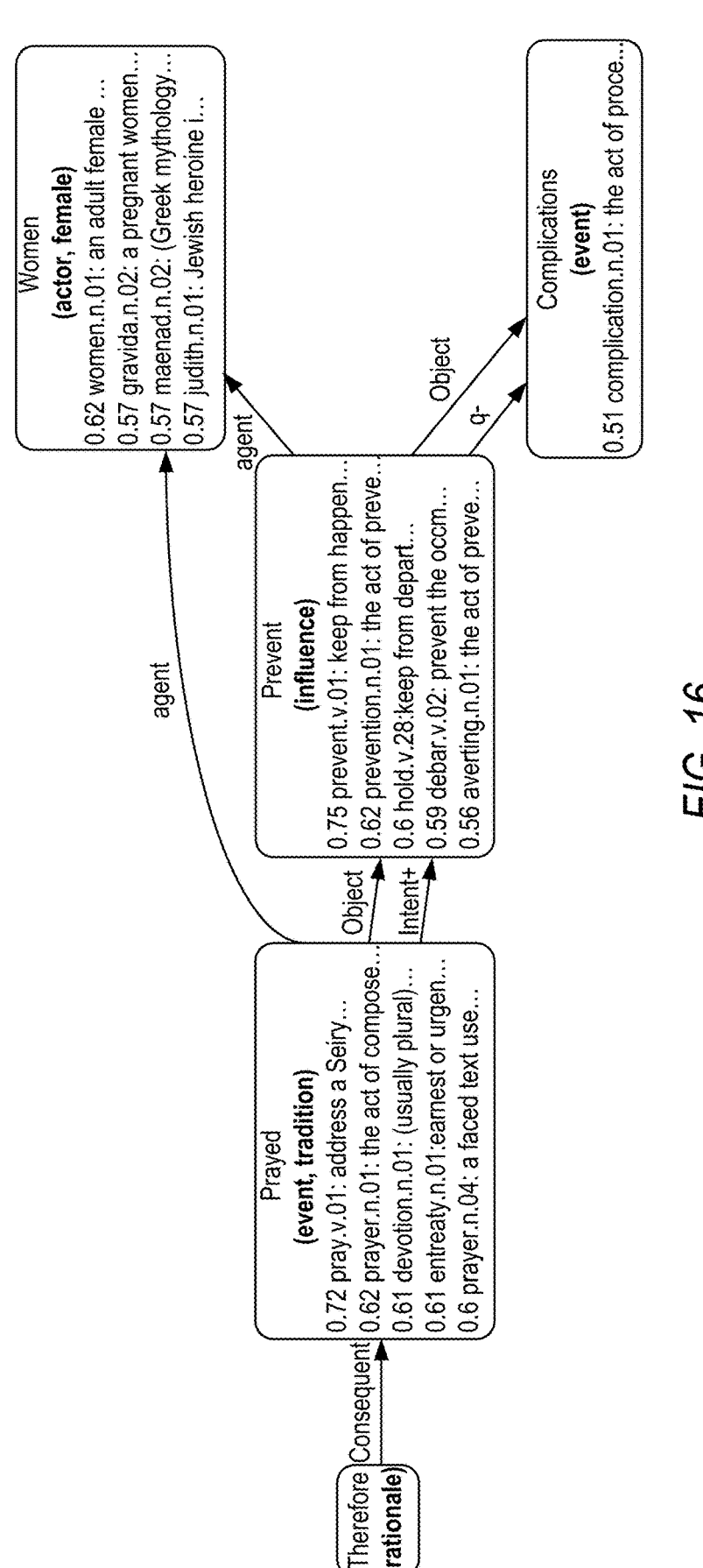
FIG. 16 illustrates a fourth example knowledge graph, in accordance with some embodiments.

FIG. 16 illustrates an example SpEAR knowledge graph for the same sentence in FIG. 15A, also displaying WordNet word senses automatically inferred by the architecture. The listed word senses include a confidence score, the WordNet SynSet name, and a truncated WordNet definition for the inferred SynSet.

After extracting the graph structure, some implementations infer a confidence distribution over word senses for each applicable node in the SpEAR graph, ignoring some pronouns, prepositions, determiners, and logical connectives. FIG. 16 illustrates the output of word sense disambiguation from our system, listing all inferred word senses with a confidence score greater than 0.5. Some implementations do not interpret the highest-confidence word sense as the single "correct" word sense. Rather, some implementations may regard each node as having a weighted semantic locale within a lexical ontology.

Word senses are inferred using a framework. A transformer-based encoder encodes a vector for each token of the sentence. Vectors for SpEAR nodes are computed by averaging the one or more constituent token vectors. The system then computes the dot-product of each node's vector against pre-computed vectors for each word sense within its sense embeddings. The dot-product results are utilized as confidence scores.

The word sense embeddings are drawn from the SynSets (i.e., synonym sets) of WordNet, a large knowledge base containing over multiple word senses. Computing a confidence distribution of WordNet word senses localizes each SpEAR node within a structured semantic hierarchy. This ultimately facilitates similarity-based reasoning within and across SpEAR graphs, for example, by computing the least common ancestor between two different nodes within the WordNet semantic hierarchy. These word senses are not evaluated in this paper due to lack of ground truth WordNet labels for our datasets, but word sense disambiguation is an important cognitive capability for natural language understanding, and is facilitated by the same transformer-based NLP as the rest of the architecture.

Some implementations relate to the SpEAR transformer-based NLP model for extracting entities, attributes, and relationships that describe qualitative causal structure. Some implementations demonstrate the approach in the domains of the SciClaim dataset of scientific claims and ethnographic corpora.

As with some NLP architectures, some implementations utilize a pre-trained transformer model within its architecture. Pretrained transformers are trained on massive corpora collected from across the internet and other sources, which speeds up subsequent machine learning, but it also means that the sub-optimal biases of the training data—including racial, ethnic, gender, and other biases—become part of the models themselves.

Figure 17:
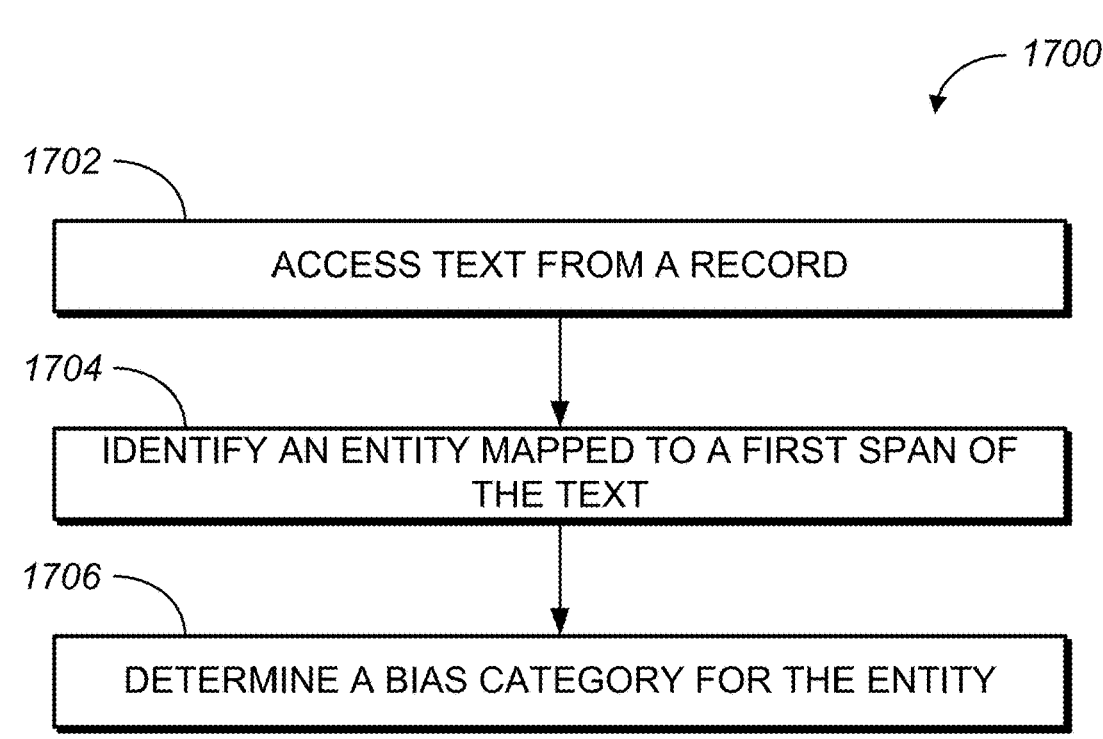
FIG. 17 is a flow chart of a method of natural language processing for identifying bias in a span of text, in accordance with some embodiments.

FIG. 17 is a flow chart of a method 1700 of natural language processing for identifying bias in a span of text, in accordance with some embodiments.

At block 1702, a computing machine (e.g., the computer 1000) accesses text from a record (e.g., a medical record, an employee record, or the like). The computing machine includes processing circuitry and memory. The computing machine may be a server that communicates with a client device to provide a user interface at the client device or may be a client device that provides a user interface via a display unit that is a part of the computing machine or connected to the computing machine by cable. The record may be stored in the memory of the computing machine or in a data repository accessible (e.g., via a network) to the computing machine.

At block 1704, the computing machine identifies, using a natural language processing engine, an entity mapped to a first span of the text. The entity may be a person, a group including one or more persons, a place or a thing. In some cases, the computing machine computes vector embeddings for various spans of text, where the vector embeddings represent the meanings of the spans. The first span and its associated entity are identified based on the vector embeddings.

At block 1706, the computing machine determines a bias category for the entity. The bias category is selected from a predefined list of bias categories. The predefined list may be stored in a memory of the computing machine or in a data repository (e.g., a database) accessible (e.g., via the network) to the computing machine. The determined bias category for the entity is determined based on a second span of the text. The second span is different from the first span. The determined bias category may be associated with an implicit bias of which the drafter of the record is not aware. Alternatively, the drafter may be aware of their bias. In some cases, the determined bias category represents a belief about a class of persons that includes the entity. The multiple bias categories from which the determined bias category is selected comprise at least three members. For example, the multiple bias categories may include at least one of aggression, laziness, attentiveness, cooperativeness, or the like.

In some implementations, the computing machine computes (e.g., to identify the entity at block 1704 and/or to determine the bias at block 1706) a vector embedding representative of the first span. The vector embedding depends on the second span. The vector embedding is a vector (e.g., of integers or real numbers) corresponds to a meaning of the text. For example, the phrases "lawyer's house" and "attorney's home" would correspond to the same vector embedding because these phrases have the same meaning. However, the phrases "kitchen table" and "garden hose" would correspond to different vector embeddings because these phrases have different meanings. An example of a phrase where the vector embedding for a first span depends on a second span is the sentence, "The old wearily man the boat." Upon parsing this sentence, the natural language processing engine may determine that "the old" is the subject, "man" is the verb, and "wearily" is an adverb potentially indicative of bias against "the old." The first span, indicative of the subject, is "the old," and the second span, indicative of bias, is "wearily." The vector embedding for "the old" corresponds to the noun (referring to elderly people) instead of the adjective based, at least in part, on the word "wearily" being placed before the word "man," thereby indicating that "man" is a verb (meaning to operate) and not a noun (meaning an adult male).

In some implementations, the computing machine determines, using a demographic mapping engine at the computing machine, a targeted bias towards one or more subgroups associated with the entity. The one or more subgroups may be identified based on metadata of the entity. The metadata may be stored in the record. For example, a medical record may include the text, "Patient was combative upon arrival at the hospital," and may include information indicating that the patient is a 53-year-old male of Elbonian descent. In the text, the entity may be the patient, and the word "combative" may correspond to a bias of the patient being aggressive. The computing machine may determine, based on this text in the medical record of the Elbonian patient, that the drafter of the text has a targeted bias towards Elbonian men, believing that Elbonian men are aggressive. This information may be useful to inform the drafter of their bias, so that they can make appropriate adjustments in their communications to or about Elbonian men. In some cases, the demographic mapping engine predicts the one or more subgroups (e.g., Elbonians, Elbonain men, males, 53-year-olds, or middle aged people) based on the metadata using a machine learning model. The machine learning model leveraging a feature vector comprising at least one of a name, a geographic location, a medical diagnosis, or the text.

In some cases, the operations of the blocks 1702, 1704, and 1706 are performed in real-time when the text is generated. As a result, a user may be able to view indications of the identified entity and the determined bias category in real-time when generating the text, and may be able to modify the text to avoid the bias. As used herein, the phrase "real-time" includes operations completed without intentional delay by the computing machine. Delay may still occur unintentionally, for example, due to slow processing speed, a lack of random access memory, poor network connection, or contention for computing resources.

In some cases, the computing machine includes a revision engine. The revision engine proposes a modification to the text that does not include the determined bias category, which a drafter or an editor of the text may accept or reject. For example, the phrase "Patient was combative upon arrival at the hospital," may have a suggested modification to: "Patient arrived at the hospital."

In some cases, the revision engine may prompt a user of the computing machine (e.g., who is creating, viewing, or editing the record) to modify or delete the second span to remove the indicia of the bias from the record. Prompting the user of the computing machine to modify or delete the second span may include presenting one or more words or subwords not associated with the determined bias category to replace the second span. The one or more words or subwords not associated with the determined bias category may be generated by a bias removal engine at the computing machine.

In some cases, the computing machine analyzes multiple records. The computing machine may identify, using multiple records including the record accessed at block 1702, a pattern of bias by a subset of drafters (e.g., employees in a given department) generating the plurality of records against a subset of entities (e.g., Elbonians) associated with the records. The computing machine may provide an output representing the identified pattern of bias. For example, the output may be provided (e.g., by email or by push notification in an application associated with the records) to an administrator, who could propose training for the subset of drafters to reduce their bias or remove their bias from records they may generate in the future.

In some cases, the pattern of bias in a subset of records generated during a first time period (e.g., before a training was given) may be compared with the pattern of bias in a subset of records generated during a second time period (e.g., after the training was given) to determine changes in bias over time. The computing machine may provide an output representing the changes in bias over time. For example, this output may be useful to determine the effectiveness of the training in reducing bias. The records may be tagged based on membership of the associated entity in a first group (e.g., Elbonians) and membership of the drafter in a second group (e.g., the given department).

In some cases, the text is in a first natural language (e.g., French). The natural language processing engine is trained in a second natural language (e.g., English) different from the first natural language. Training the natural language processing engine leverages zero-shot cross-lingual model transfer from the second natural language to the first natural language.

Figure 18:
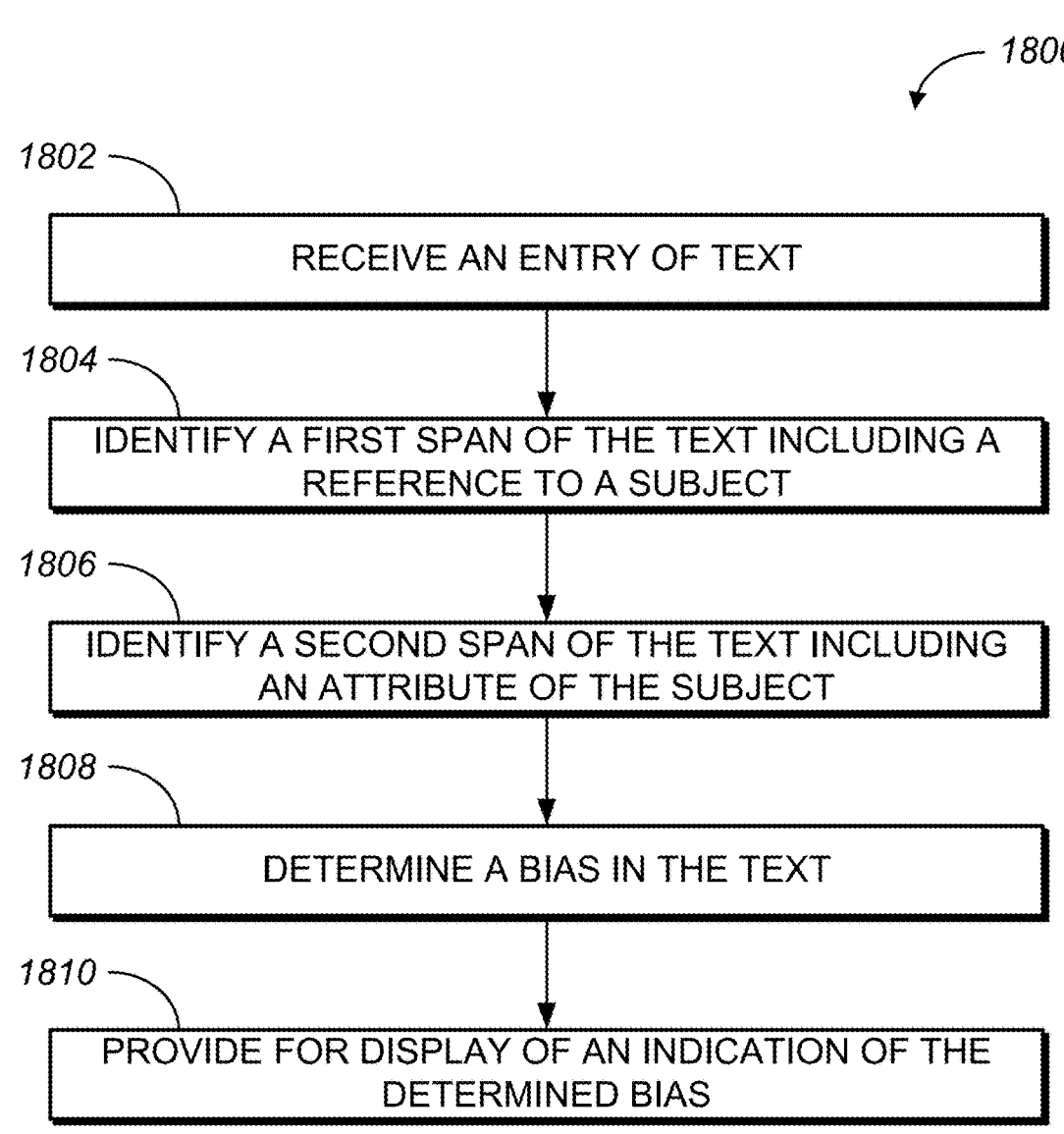
FIG. 18 is a flow chart of a method of natural language processing for displaying an indication of bias applied to a subject of a text, in accordance with some embodiments.

FIG. 18 is a flow chart of a method 1800 of natural language processing for displaying an indication of bias applied to a subject of a text, in accordance with some embodiments.

At block 1802, a computing machine (e.g., the computer 1000) receives an entry of text via a GUI. The entry of text may be made into a record (e.g., a medical record, an employee record, or the like). The entry of text may be made at the computing machine if the computing machine is a client device (e.g., an end-user device such as a laptop computer, a desktop computer, a mobile phone, a tablet, or the like). Alternatively, the entry of text may be made at a client device coupled to the computing machine, with the computing machine being a server.

At block 1804, the computing machine identifies a first span of the text including a reference to a subject. The identification may be made using an entity classifier subengine (e.g., the entity classification engine 1004) of a natural language processing engine (e.g., the natural language processing engine 1002). In one example, the entry of text is entered into a healthcare record, and the subject is a patient.

At block 1806, the computing machine identifies, using the natural language processing engine, a second span of the text including an attribute of the subject. The second span of the text is different from the first span of the text. Each of the first span and the second span may be contiguous.

At block 1808, the computing machine determines a bias in the text. The bias may be determined based on the second span of the text and using a bias determination engine (e.g., the bias determination engine 1008). The bias determination engine may include at least one artificial neural network (e.g., as described in conjunction with FIGS. 1-4). The bias determination engine may leverage a feature vector that includes at least the first span of the text and the second span of the text.

The bias determination engine may determine the bias in the text based on the second span of text being used in a stigmatizing context. It should be noted that the same words or phrases may sometimes have a stigmatizing context (indicating bias) and sometimes lack the stigmatizing context as described, for example, in conjunction with FIG. 8.

At block 1810, the computing machine provides for display, via the graphical user interface, of an indication of the determined bias and the second span of the text. In some cases, the determined bias may be presented in a sidebar of the GUI. The second span of the text may be emphasized within the GUI, for example, by at least one of bolding, italicizing, underlining, or highlighting the second span of the text. As a result, a user viewing the GUI may be able to see the determined bias and the second span of the text which supported the conclusion of the text having the determined bias. The user may be able to modify the text to remove the bias, for example, by editing or removing the second span of the text.

In some implementations, the computing machine also provides for display, via the GUI, of a prompt to modify the text to remove the bias. The prompt may include a proposed modification of the text lacking the bias. The proposed modification may be generated using a bias removal engine at the computing machine or another computer. The bias removal engine may leverage artificial intelligence or machine learning techniques (e.g., as described in conjunction with FIGS. 1-4) to modify the text into a form that lacks the bias.

In some implementations, providing for display of the indication of bias (at block 1810) occurs in real-time after the entry of the text is received (at block 1802). Real-time may include occurring with a delay of one second, one minute, one hour or the like. However, the delay might not be intentional and might be caused by factors including at least one of processing speed, network speed, contention for computational resources, availability or lack of memory, or the like.

Some embodiments are described as numbered examples (Example 1, 2, 3, etc.). These are provided as examples only and do not limit the technology disclosed herein.

Example 1 is a method comprising: accessing, at a computing machine comprising processing circuitry and memory, text from a record; identifying, using a natural language processing engine at the computing machine, an entity mapped to a first span of the text, wherein the first span includes, a contiguous sequence of one or more words or subwords in the text; and determining a bias category for the entity, wherein the bias category is selected from a predefined list of bias categories, wherein the determined bias category for the entity depends on a second span of the text, wherein the second span includes a contiguous sequence of one or more words or subwords in the text, wherein the second span is different from the first span.

In Example 2, the subject matter of Example 1 includes, computing a vector embedding representative of the first span, wherein the vector embedding depends on the second span, and wherein the entity is identified based on the computed vector embedding.

In Example 3, the subject matter of Examples 1-2 includes, determining, using a demographic mapping engine, a targeted bias toward one or more subgroups associated with the entity, the one or more subgroups being identified based on metadata of the entity, the metadata being stored in the record.

In Example 4, the subject matter of Example 3 includes, wherein the demographic mapping engine predicts the one or more subgroups based on the metadata using a machine learning model, the machine learning model leveraging a feature vector comprising at least one of: a name, a geographic location, a medical diagnosis, or the text.

In Example 5, the subject matter of Examples 1~4 includes, wherein the bias determination engine determines the bias in the text in real-time when the text is generated.

In Example 6, the subject matter of Examples 1-5 includes, providing, using a revision engine at the computing machine, a modification to the text that does not correspond to the determined bias category.

In Example 7, the subject matter of Examples 1-6 includes, prompting a user of the computing machine to modify or delete the second span.

In Example 8, the subject matter of Example 7 includes, wherein prompting the user of the computing machine to modify or delete the second span comprises: presenting one or more words or subwords not associated with the determined bias category to replace the second span, the one or more words or subwords not associated with the determined bias category being generated by a bias removal engine.

In Example 9, the subject matter of Examples 1-8 includes, identifying, using a plurality of records including the record, a pattern of bias by a subset of drafters generating the plurality of records against a subset of entities associated with the plurality of records; and providing an output representing the identified pattern of bias.

In Example 10, the subject matter of Example 9 includes, comparing the pattern of bias in a subset of the plurality of records generated during a first time period with the pattern of bias in a subset of the plurality of records generated during a second time period to determine changes in bias over time; and providing an output representing the changes in bias over time.

In Example 11, the subject matter of Examples 9-10 includes, wherein the plurality of records are tagged based on membership of an associated entity in a first group and membership of an associated drafter in a second group.

In Example 12, the subject matter of Examples 1-11 includes, wherein the text is in a first natural language, wherein the natural language processing engine is trained in a second natural language, different from the first natural language, wherein training the natural language processing engine leverages zero-shot cross-lingual model transfer from the second natural language to the first natural language.

In Example 13, the subject matter of Examples 1-12 includes, wherein the determined bias category is associated with an implicit bias determined based on the second span.

In Example 14, the subject matter of Examples 1-13 includes, wherein the determined bias category represents a belief about a class of persons that includes the entity, wherein the multiple bias categories from which the determined bias category is selected comprise at least three members.

Example 15 is a non-transitory computer-readable medium storing instructions which, when executed by processing circuitry, cause the processing circuitry to perform operations comprising: accessing text from a record; identifying, using a natural language processing engine, an entity mapped to a first span of the text, wherein the first span includes, a contiguous sequence of one or more words or subwords in the text; and determining a bias category for the entity, wherein the bias category is selected from a predefined list of bias categories, wherein the determined bias category for the entity depends on a second span of the text, wherein the second span includes a contiguous sequence of one or more words or subwords in the text, wherein the second span is different from the first span.

In Example 16, the subject matter of Example 15 includes, the operations further comprising: computing a vector embedding representative of the first span, wherein the vector embedding depends on the second span, and wherein the entity is identified based on the computed vector embedding.

In Example 17, the subject matter of Examples 15-16 includes, the operations further comprising: determining, using a demographic mapping engine, a targeted bias toward one or more subgroups associated with the at least one entity, the one or more subgroups being identified based on metadata of the at least one entity, the metadata being stored in the record.

Example 18 is a system comprising: processing circuitry; and a memory storing instructions which, when executed by the processing circuitry, cause the processing circuitry to perform operations comprising: accessing text from a record; identifying, using a natural language processing engine, an entity mapped to a first span of the text, wherein the first span includes, a contiguous sequence of one or more words or subwords in the text; and determining a bias category for the entity, wherein the bias category is selected from a predefined list of bias categories, wherein the determined bias category for the entity depends on a second span of the text, wherein the second span includes a contiguous sequence of one or more words or subwords in the text, wherein the second span is different from the first span.

In Example 19, the subject matter of Example 18 includes, the operations further comprising: computing a vector embedding representative of the first span, wherein the vector embedding depends on the second span, and wherein the entity is identified based on the computed vector embedding.

In Example 20, the subject matter of Examples 18-19 includes, the operations further comprising: determining, using a demographic mapping engine, a targeted bias toward one or more subgroups associated with the at least one entity, the one or more subgroups being identified based on metadata of the at least one entity, the metadata being stored in the record.

Example 21 is a system comprising: processing circuitry; and a memory storing instructions which, when executed by the processing circuitry, cause the processing circuitry to perform operations comprising: receiving, via a graphical user interface, an entry of text; identifying, using an entity classifier sub-engine of a natural language processing engine, a first span of the text including a reference to a subject; identifying, using the natural language processing engine, a second span of the text including an attribute of the subject; determining, based on the second span of the text and using a bias determination engine, a bias in the text; and providing for display, via the graphical user interface, of an indication of the determined bias and the second span of the text.

In Example 22, the subject matter of Example 21 includes, the operations further comprising: providing for display, via the graphical user interface, of a prompt to modify the text to remove the bias, the prompt comprising a proposed modification of the text lacking the bias.

In Example 23, the subject matter of Examples 21-22 includes, wherein the second span of the text is different from the first span of the text, wherein the second span of the text is contiguous, wherein the first span of the text is contiguous.

In Example 24, the subject matter of Examples 21-23 includes, wherein the bias determination engine comprises at least one artificial neural network, wherein the bias determination engine leverages a feature vector comprising at least the first span of the text and the second span of the text.

In Example 25, the subject matter of Examples 21-24 includes, wherein the bias determination engine determines the bias in the text based on the second span of the text being used in a stigmatizing context.

In Example 26, the subject matter of Examples 21-25 includes, wherein the indication of the determined bias and second span of the text are displayed in real-time after the entry of the text is received.

In Example 27, the subject matter of Examples 21-26 includes, wherein the entry of the text is entered into a healthcare record, and wherein the subject is a patient.

In Example 28, the subject matter of Examples 21-27 includes, wherein the indication of the determined bias comprises emphasizing a portion of the text comprising the second span of the text used to determine the bias and displaying text identifying the determined bias within a sidebar of the graphical user interface.

Example 29 is a method comprising: receiving, via a graphical user interface, an entry of text; identifying, using an entity classifier sub-engine of a natural language processing engine, a first span of the text including a reference to a subject; identifying, using the natural language processing engine, a second span of the text including an attribute of the subject; determining, based on the second span of the text and using a bias determination engine, a bias in the text; and providing for display, via the graphical user interface, of an indication of the determined bias and the second span of the text.

In Example 30, the subject matter of Example 29 includes, providing for display, via the graphical user interface, of a prompt to modify the text to remove the bias, the prompt comprising a proposed modification of the text lacking the bias.

In Example 31, the subject matter of Examples 29-30 includes, wherein the second span of the text is different from the first span of the text, wherein the second span of the text is contiguous, wherein the first span of the text is contiguous.

In Example 32, the subject matter of Examples 29-31 includes, wherein the bias determination engine comprises at least one artificial neural network, wherein the bias determination engine leverages a feature vector comprising at least the first span of the text and the second span of the text.

In Example 33, the subject matter of Examples 29-32 includes, wherein the bias determination engine determines the bias in the text based on the second span of the text being used in a stigmatizing context.

In Example 34, the subject matter of Examples 29-33 includes, wherein the indication of the determined bias and the second span of the text are displayed in real-time after the entry of the text is received.

In Example 35, the subject matter of Examples 29-34 includes, wherein the entry of the text is entered into a healthcare record, and wherein the subject is a patient.

In Example 36, the subject matter of Examples 29-35 includes, wherein the indication of the determined bias comprises emphasizing a portion of the text comprising the second span of the text used to determine the bias and displaying text identifying the determined bias within a sidebar of the graphical user interface.

Example 37 is a non-transitory computer-readable medium storing instructions which, when executed by processing circuitry, cause the processing circuitry to perform operations comprising: receiving, via a graphical user interface, an entry of text; identifying, using an entity classifier sub-engine of a natural language processing engine, a first span of the text including a reference to a subject; identifying, using the natural language processing engine, a second span of the text including an attribute of the subject; determining, based on the second span of the text and using a bias determination engine, a bias in the text; and providing for display, via the graphical user interface, of an indication of the determined bias and the second span of the text.

In Example 38, the subject matter of Example 37 includes, the operations further comprising: providing for display, via the graphical user interface, of a prompt to modify the text to remove the bias, the prompt comprising a proposed modification of the text lacking the bias.

In Example 39, the subject matter of Examples 37-38 includes, wherein the second span of the text is different from the first span of the text, wherein the second span of the text is contiguous, wherein the first span of the text is contiguous.

In Example 40, the subject matter of Examples 37-39 includes, wherein the bias determination engine comprises at least one artificial neural network, wherein the bias determination engine leverages a feature vector comprising at least the first span of the text and the second span of the text.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The above described arrangements and embodiments are presented for the purposes of illustration and not of limitation, and that various modifications can be made by those skilled in the art without departing from the scope or spirit of the disclosure. One or more parts of techniques described above may be performed in a different order (or concurrently) and still achieve desirable results. In addition, techniques of the disclosure may be implemented in hardware, such as on an application specific integrated circuit (ASIC) or on a field-programmable gate array (FPGA). The techniques of the disclosure may also be implemented in software.

What is claimed is:

1. A method comprising:
accessing, at a computing machine comprising processing circuitry and memory, text from a record;
identifying, using a natural language processing engine at the computing machine, an entity mapped to a first span of the text, wherein the first span comprises an entity span, wherein the first span includes a contiguous sequence of one or more words or subwords in the text;
determining a bias category for the entity, wherein the bias category is selected from a predefined list of bias categories, wherein the determined bias category for the entity depends on a second span of the text, wherein the second span comprises a bias span, wherein the second span includes a contiguous sequence of one or more words or subwords in the text, wherein the second span is different from the first span, wherein determining the bias category comprises computing a vector embedding representative of the first span using an attention-based span representation that computes attention weight scalars for each token vector in the first span using learned parameters, wherein the attention weight scalars for each token vector in the first span are computed based on token vectors in the second span such that the vector embedding representative of the first span is contextualized by the second span, wherein determining the bias category further comprises classifying the contextualized vector embedding representative of the first span into the bias category selected from the predefined list of bias categories, wherein the vector embedding depends on the second span, wherein the entity is identified based on the computed vector embedding, wherein the text is in a first natural language, wherein the natural language processing engine is trained in a second natural language, different from the first natural language, wherein training the natural language processing engine leverages zero-shot cross-lingual model transfer from the second natural language to the first natural language; and causing display of an identification of the determined bias category within a sidebar of a graphical user interface.

2. The method of claim 1, further comprising:

determining a targeted bias toward one or more subgroups associated with the entity, the one or more subgroups being identified based on metadata of the entity, the metadata being stored in the record.

3. The method of claim 2, wherein determining the targeted bias comprises predicting the one or more subgroups based on the metadata using a machine learning model, the machine learning model leveraging a feature vector comprising at least one of: a name, a geographic location, a medical diagnosis, or the text.

4. The method of claim 1, wherein determining the bias category occurs in real-time when the text is generated.

5. The method of claim 1, further comprising:

providing a modification to the text that does not correspond to the determined bias category.

6. The method of claim 1, further comprising:

prompting a user of the computing machine to modify or delete the second span.

7. The method of claim 6, wherein prompting the user of the computing machine to modify or delete the second span comprises: presenting one or more words or subwords not associated with the determined bias category to replace the second span, the one or more words or subwords not associated with the determined bias category being generated by the computing machine.

8. The method of claim 1, further comprising:

identifying, using a plurality of records including the record, a pattern of bias by a subset of drafters generating the plurality of records against a subset of entities associated with the plurality of records; and providing an output representing the identified pattern of bias.

9. The method of claim 8, further comprising:

comparing the pattern of bias in a subset of the plurality of records generated during a first time period with the pattern of bias in a subset of the plurality of records generated during a second time period to determine changes in bias over time; and providing an output representing the changes in bias over time.

10. The method of claim 8, wherein the plurality of records are tagged based on membership of an associated entity in a first group and membership of an associated drafter in a second group.

11. The method of claim 1, wherein the determined bias category is associated with an implicit bias determined based on the second span.

12. The method of claim 1, wherein the determined bias category represents a belief about a class of persons that includes the entity, wherein the multiple bias categories from which the determined bias category is selected comprise at least three members.

13. A non-transitory computer-readable medium storing instructions which, when executed by processing circuitry, cause the processing circuitry to perform operations comprising:

accessing text from a record;

identifying, using a natural language processing engine, an entity mapped to a first span of the text, wherein the first span comprises an entity span, wherein the first span includes a contiguous sequence of one or more words or subwords in the text;

determining a bias category for the entity, wherein the bias category is selected from a predefined list of bias categories, wherein the determined bias category for the entity depends on a second span of the text, wherein the second span comprises a bias span, wherein the second span includes a contiguous sequence of one or more words or subwords in the text, wherein the second span is different from the first span, wherein determining the bias category comprises computing a vector embedding representative of the first span using an attention-based span representation that computes attention weight scalars for each token vector in the first span using learned parameters, wherein the attention weight scalars for each token vector in the first span are computed based on token vectors in the second span such that the vector embedding representative of the first span is contextualized by the second span, wherein determining the bias category further comprises classifying the contextualized vector embedding representative of the first span into the bias category selected from the predefined list of bias categories, wherein the vector embedding depends on the second span, wherein the entity is identified based on the computed vector embedding, wherein the text is in a first natural language, wherein the natural language processing engine is trained in a second natural language, different from the first natural language, wherein training the natural language processing engine leverages zero-shot cross-lingual model transfer from the second natural language to the first natural language; and causing display of an identification of the determined bias category within a sidebar of a graphical user interface.

14. The computer-readable medium of claim 13, the operations further comprising:

determining a targeted bias toward one or more subgroups associated with the at least one entity, the one or more subgroups being identified based on metadata of the entity, the metadata being stored in the record.

15. A system comprising:

processing circuitry; and a memory storing instructions which, when executed by the processing circuitry, cause the processing circuitry to perform operations comprising:

accessing text from a record;

identifying, using a natural language processing engine, an entity mapped to a first span of the text, wherein the first span comprises an entity span, wherein the first span includes a contiguous sequence of one or more words or subwords in the text;

determining a bias category for the entity, wherein the bias category is selected from a predefined list of bias categories, wherein the determined bias category for the entity depends on a second span of the text, wherein the second span comprises a bias span, wherein the second span includes a contiguous sequence of one or more words or subwords in the text, wherein the second span is different from the first span, wherein determining the bias category comprises computing a vector embedding representative of the first span using an attention-based span representation that computes attention weight scalars for each token vector in the first span using learned parameters, wherein the attention weight scalars for each token vector in the first span are computed based on token vectors in the second span such that the vector embedding representative of the first span is contextualized by the second span, wherein determining the bias category further comprises classifying the contextualized vector embedding representative of the first span into the bias category selected from the predefined list of bias categories, wherein the vector embedding depends on the second span, wherein the entity is identified based on the computed vector embedding, wherein the text is in a first natural language, wherein the natural language processing engine is trained in a second natural language, different from the first natural language, wherein training the natural language processing engine leverages zero-shot cross-lingual model transfer from the second natural language to the first natural language; and causing display of an identification of the determined bias category within a sidebar of a graphical user interface.

16. The system of claim 15, the operations further comprising:

determining a targeted bias toward one or more subgroups associated with the entity, the one or more subgroups being identified based on metadata of the at least one entity, the metadata being stored in the record.

17. The method of claim 1, wherein the vector embedding is computed by generating vectors for tokens in the text using a transformer-based natural language processing architecture and combining the vectors associated with the first span using the attention-based span representation, and wherein determining the bias category comprises applying a multi-label classifier to the vector embedding to output confidence scores for each bias category in the predefined list.

18. The method of claim 1, wherein an indication of the determined bias category and the second span of the text are displayed in real-time after an entry of the text is received, wherein the indication of the determined bias category comprises an emphasizing of a portion of the text comprising the second span of the text used to determine the bias category.

* * * * *